(12) United States Patent
Miyatake et al.

(10) Patent No.: US 11,979,839 B2
(45) Date of Patent: May 7, 2024

(54) INTERFERENCE WAVE CALCULATION METHOD, INTERFERENCE WAVE CALCULATION APPARATUS, COMPUTER PROGRAM

(71) Applicant: Nippon Telegraph and Telephone Corporation, Tokyo (JP)

(72) Inventors: Ryo Miyatake, Musashino (JP); Yusuke Asai, Musashino (JP); Daisei Uchida, Musashino (JP); Kazunori Akabane, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 387 days.

(21) Appl. No.: 17/603,647

(22) PCT Filed: Apr. 6, 2020

(86) PCT No.: PCT/JP2020/015496
§ 371 (c)(1),
(2) Date: Oct. 14, 2021

(87) PCT Pub. No.: WO2020/217946
PCT Pub. Date: Oct. 29, 2020

(65) Prior Publication Data
US 2022/0248340 A1    Aug. 4, 2022

(30) Foreign Application Priority Data

Apr. 26, 2019  (JP) .................................. 2019-086846

(51) Int. Cl.
*H04W 52/24* (2009.01)
*H04B 7/08* (2006.01)
(Continued)

(52) U.S. Cl.
CPC ............ *H04W 52/243* (2013.01); *H04B 7/08* (2013.01); *H04B 17/345* (2015.01); *H04W 16/28* (2013.01)

(58) Field of Classification Search
CPC ... H04W 52/243; H04W 16/28; H04W 52/42; H04W 72/542; H04W 4/023; H04W 72/54; H04W 72/541; H04W 72/543; H04W 40/12; H04B 7/08; H04B 17/345; H04B 1/1027; H04B 17/336; H04B 17/327;
(Continued)

(56) References Cited

U.S. PATENT DOCUMENTS 11,350,422 B2 *   5/2022   Furuichi .............. H04B 7/0456
2003/0157897 A1*  8/2003   Maeda ................... H01Q 25/00
                                                     455/67.13

(Continued)

FOREIGN PATENT DOCUMENTS

JP    2011146850    7/2011
JP    2016015570    1/2016

*Primary Examiner* — Lana N Le
(74) *Attorney, Agent, or Firm* — Fish & Richardson P.C.

(57) ABSTRACT

An interference wave arithmetic operation method performed by a wireless communication system including a plurality of antennas, the method including: determining an interferer antenna on the basis of information regarding directivity, a position, and an orientation of each of the plurality of antennas; and calculating interference wave reception intensity of a victim antenna using an interference wave from the determined interferer antenna.

12 Claims, 16 Drawing Sheets

(51) Int. Cl.
*H04B 17/345* (2015.01)
*H04W 16/28* (2009.01)

(58) Field of Classification Search
CPC .. H01Q 3/00; H01Q 1/24; H01Q 1/22; H01Q 21/00; H01Q 25/00; H01Q 3/2611
See application file for complete search history.

(56) References Cited

U.S. PATENT DOCUMENTS

| | | | |
|---|---|---|---|
| 2004/0053581 A1* | 3/2004 | Iwami | H04B 7/0848 |
| | | | 455/101 |
| 2005/0250451 A1* | 11/2005 | Richardson | H04B 17/345 |
| | | | 455/63.1 |
| 2011/0116569 A1* | 5/2011 | Vaughan | H04B 7/08 |
| | | | 375/295 |
| 2017/0272140 A1* | 9/2017 | Liou | H04B 7/0632 |
| 2021/0100005 A1* | 4/2021 | Furuichi | H04W 72/046 |
| 2022/0353697 A1* | 11/2022 | Saha | H04B 7/08 |

* cited by examiner

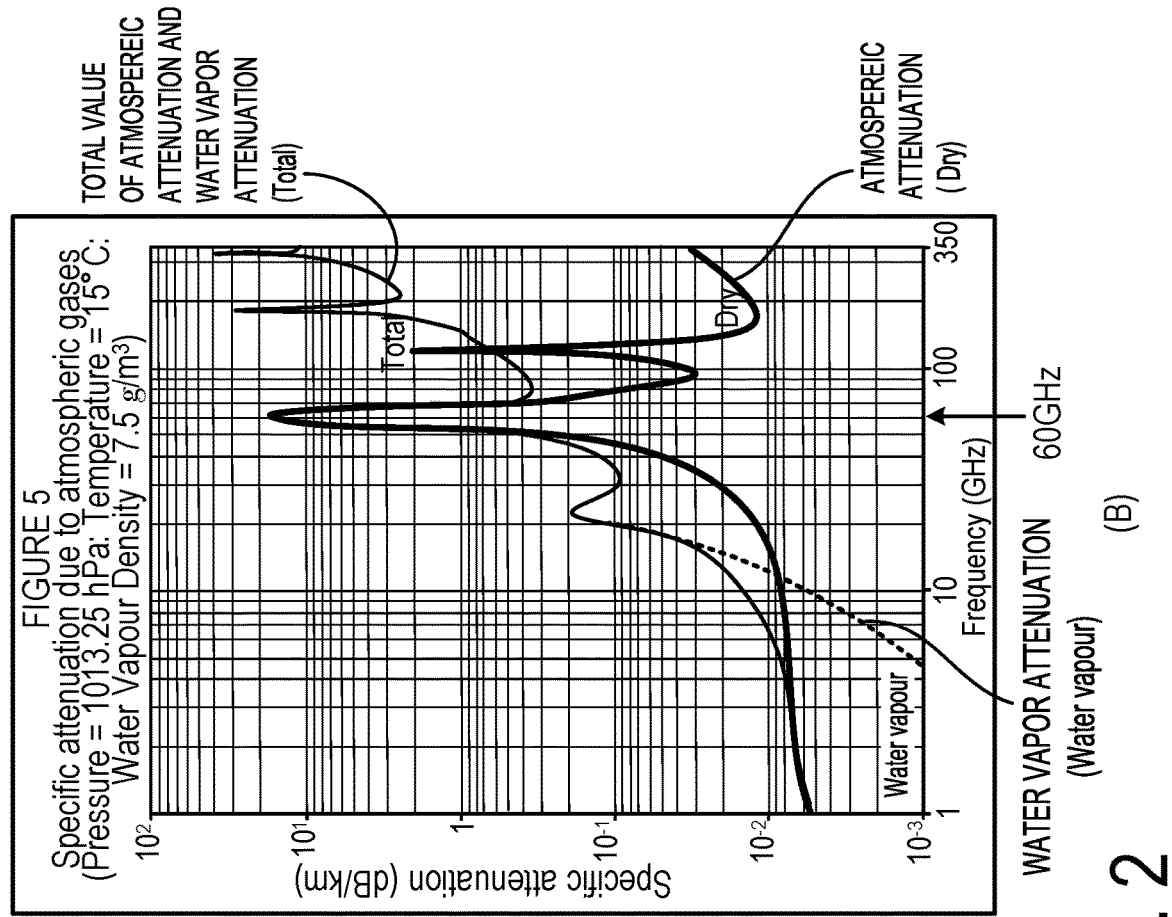
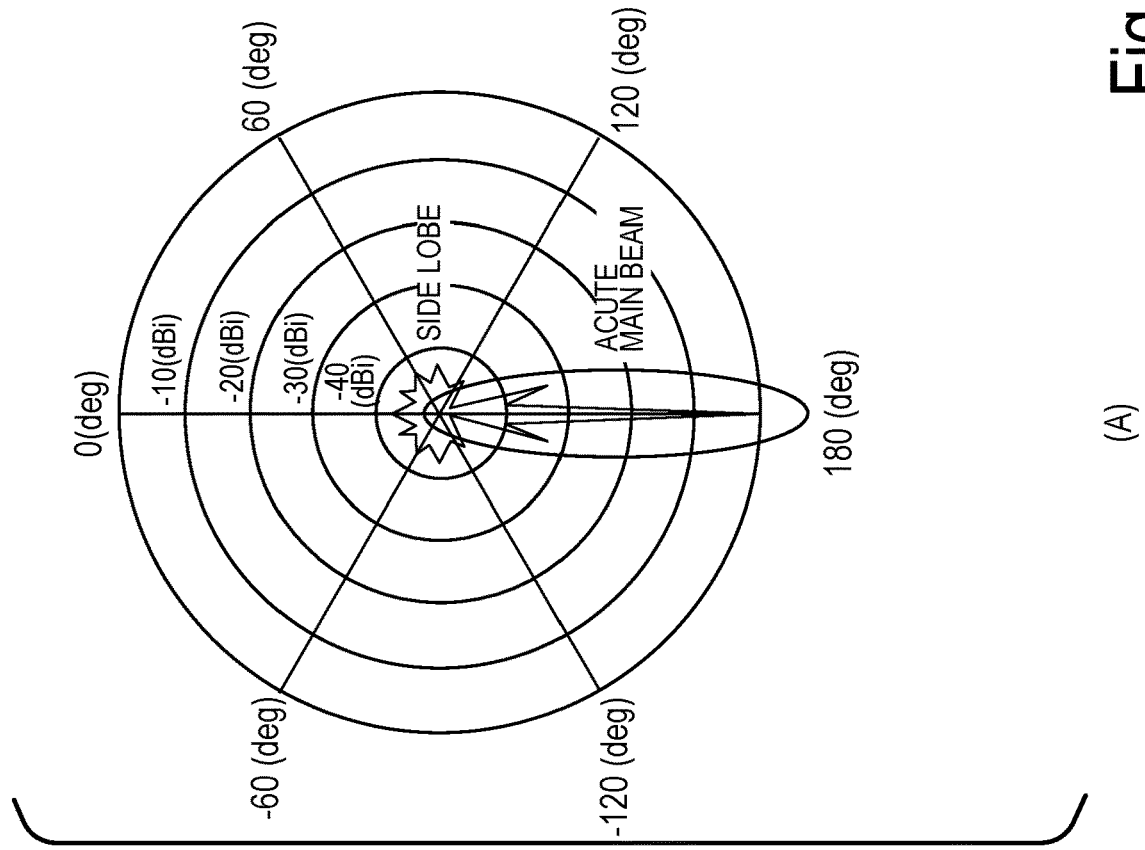
Fig. 2

| ANTENNA ID | WIRELESS PARAMETER ||||  INSTALLATION PARAMETER || ANTENNA ID OF COMMUNICATION COUNTERPART |
| | TRANSMISSION POWER | MAXIMUM ANTENNA GAIN | ANTENNA DIRECTIVITY PATTERN | ELECTRIC WAVE SPECTRUM CHARACTERISTIC | INSTALLATION POSITION (x, y, z) | INSTALLATION ANGLE | |
| --- | --- | --- | --- | --- | --- | --- | --- |
| AAA | 4 | 40 | 0 DEGREES: 0 dBi<br>1 DEGREE: -5 dBi<br>... | ELECTRIC POWER IS REDUCED BY $yy_1$ (dB) WITH FREQUENCY DIFFERENCE $xx_1$ (Hz); IS REDUCED BY $yy_2$ WITH FREQUENCY DIFFERENCE $xx_2$;<br>... | (10, 14, 34) | $\theta_{AAA}$ | BBB |
| BBB | 6 | 40 | 0 DEGREES: 0 dBi<br>1 DEGREE: -5 dBi<br>... | ELECTRIC POWER IS REDUCED BY $yy_1$ (dB) WITH FREQUENCY DIFFERENCE $xx_1$ (Hz); IS REDUCED BY $yy_2$ WITH FREQUENCY DIFFERENCE $xx_2$;<br>... | (15, 24, 34) | $\theta_{BBB}$ | AAA |
| CCC | 4 | 30 | 0 DEGREES: 0 dBi<br>1 DEGREE: -5 dBi<br>... | ELECTRIC POWER IS REDUCED BY $yy_1$ (dB) WITH FREQUENCY DIFFERENCE $xx_1$ (Hz); IS REDUCED BY $yy_2$ WITH FREQUENCY DIFFERENCE $xx_2$;<br>... | (30, 14, 24) | $\theta_{CCC}$ | DDD |
| DDD | 4 | 30 | 0 DEGREES: 0 dBi<br>1 DEGREE: -5 dBi<br>... | ELECTRIC POWER IS REDUCED BY $yy_1$ (dB) WITH FREQUENCY DIFFERENCE $xx_1$ (Hz); IS REDUCED BY $yy_2$ WITH FREQUENCY DIFFERENCE $xx_2$;<br>... | (10, 54, 34) | $\theta_{DDD}$ | CCC |
| ... | ... | ... | ... | ... | ... | ... | ... |

Fig. 6

INTERFERENCE WAVE CALCULATION METHOD, INTERFERENCE WAVE CALCULATION APPARATUS, COMPUTER PROGRAM

CROSS-REFERENCE TO RELATED APPLICATIONS

This application is a National Stage application under 35 U.S.C. § 371 of International Application No. PCT/JP2020/015496, having an International Filing Date of Apr. 6, 2020, which claims priority to Japanese Application Serial No. 2019-086846, filed on Apr. 26, 2019. The disclosure of the prior application is considered part of the disclosure of this application, and is incorporated in its entirety into this application.

TECHNICAL FIELD

The present invention relates to an interference wave arithmetic operation method, an interference wave arithmetic operation device, and a computer program.

BACKGROUND ART

In the related art, there is a need to temporarily and instantly construct large-volume information transmission networks for the purpose of communicating information and transmitting videos in environments such as construction sites or mountain areas with no optical infrastructures, event sites, racing circuits, and disaster scenes. However, installation work using fibers and the like requires time and cost. Thus, methods for constructing large-volume networks capable of transmitting information at arbitrary distances using a plurality of commercially available millimeter wave fixed wireless access (FWA) antenna capable of performing large-volume communication in a Gbps order in a wireless manner to achieve multihop relay without any need of laying work have been considered, and the need therefor has been increasing. Also, there has been an increasing need to use high-frequency bands for the purpose of performing large-volume communication and the like in wireless communication in addition to such temporary utilization.

The communication capacity in wireless communication is degraded due to interference waves, and measures against interference based on base-station design are thus essential to construct a large-volume network. The interference includes intra-system interference and inter-system interference. In a multihop network, antennas belonging to the same system are located closest at relay points. The measures against intra-system interference are thus particularly important. As a measure against intra-system interference, a change in wireless device parameters (transmission power, a modulation scheme, modulation multi-leveled numbers, a communication speed, an error correction scheme, and antenna directivity control, for example) and installation parameters (an antenna installation location and an installation angle, for example) for each antenna in the same system is conceivable.

Here, although different commercially available products (commercially available wireless stations) have different changeable wireless parameters, there is a high probability that basic parameters such as a transmission power can be changed, the amount of interference received by a wireless station can be directly changed by changing a transmission power of an interference source, and control of the transmission power is thus considered to be a promising measure against interference. In a case in which such transmission power control is performed, it is important to estimate the amount of interference between antennas. Even in a case in which a communication distance is short, desired reception power has a sufficient margin with respect to receiver noise, and the amount of interference is large even in a situation in which the transmission power can be sufficiently reduced in this regard, for example, it is not possible to significantly reduce the transmission power if the margin is small with respect to the amount of interference. It is thus necessary to estimate the amount of interference for an individual antenna in order to appropriately control the transmission power.

As described above, it is necessary to prepare a measure against interference in order to construct a large-volume wireless network, and control or the like of a transmission power that can be changed in many commercially available products and directly affects the amount of interference is conceivable as a countermeasure against interference. For the control, it is important to estimate the amount of interference between the antennas. As an interference estimation technique in the related art, a method of alleviating interference by calculating the amount of interference between antennas in a multi-hop network and changing transmission power has been proposed (see Patent Literature 1).

FIG. 13 is a configuration diagram illustrating a system configuration of a wireless communication system 1000 in the related art. The wireless communication system 1000 includes a plurality of antennas 10 (10-A, 10-B1, 10-B2, and 10-C) and an antenna control device 200. The plurality of antennas 10 and the antenna control device 200 are connected to each other in a communicable state through wired connection or through wireless connection prepared separately from the system.

An example of a system in which a plurality of FWAs using millimeter waves are present will be described below.

The antenna 10 is an antenna using a millimeter wave FWA. The antenna 10 performs communication with an antenna 10 that is a communication counterpart. In FIG. 13, it is assumed that the antenna 10-A is installed at a point A, the antennas 10-B1 and 10-B2 are installed at a point B, and the antenna 10-C is installed at a point C. Also, it is assumed that bidirectional communication between the antenna 10-A and the antenna 10-C is performed via the point B. The antenna 10-A and the antenna 10-B1 are connected wirelessly, as are the antenna 10-B2 and the antenna 10-C. Also, the antennas 10-B1 and 10-B2 are connected through wired connection or through wireless connection prepared separately from the system.

The antenna control device 200 estimates interference of each antenna 10 in wired and wireless manner or through wireless connection prepared separately from the system. Specifically, the antenna control device 200 controls a transmission power of each antenna 10 by performing Steps 1 to 3 below.

The antenna control device 200 functions as a device including a parameter storage unit 2001, a reception intensity calculation unit 2002, an interference intensity calculation unit 2003, a margin calculation unit 2004, a transmission power control unit 2005, and a communication unit 206.

Next, Steps 1 to 3 performed by the antenna control device 200 will be described in detail.

In Step 1, the antenna control device 200 quantifies (digitizes) an interference wave I and a desired wave C that are control targets.

In Step 2, the antenna control device 200 calculates a carrier-to-interference ratio (CIR) and a carrier-to-noise interference ratio (CINR) from the values quantified in Step 1 and obtains a margin from a required CIR, a required CINR, acceptable interference wave intensity, a lowest reception level, and the like that are values that determine communication quality. Here, the lowest reception level means a minimum necessary reception level for a receiver to perform demodulation while securing desired quality. These values are determined, for example, by performance and the like of a wireless station itself in which "C needs to be equal to or greater than C_req (dBm), I needs to be equal to or less than I_req (dBm), CIR needs to be equal to or greater than CIR_req (dBm), and CINR needs to be equal to or greater than CINR_req (dBm) in order to obtain a communication speed equal to or greater than YY bps or a communication error rate (bit error rate) equal to or less than ZZ %".

The required CIR is calculated on the basis of the reception intensity of an interference wave that a victim antenna receives from other antennas (hereinafter referred to as "interference wave intensity" or "I") and reception intensity of a desired wave that the victim antenna receives (hereinafter referred to as "desired wave intensity" or "C"). The interference wave is a signal transmitted from an interferer antenna different from an antenna 10 that is a communication counterpart of the victim antenna. The interference wave intensity is calculated by the interference intensity calculation unit 2002. The desired wave is a signal transmitted from the antenna 10 that is the communication counterpart of the victim antenna. The desired wave is calculated by the reception intensity calculation unit 2003. Also, the required CINR is calculated on the basis of noise power N of the receiver in addition to C and I. Next, the antenna control device 200 performs transmission power control for reducing interference on the basis of the margin of the quantified amount of interference in Step 3 as needed.

Next, a case in which simulation in Step 1 (quantification (digitization) of the interference wave and the desired wave that are control targets) is used among the steps performed by the antenna control device 200 will be described in detail.

The antenna control device 200 calculates the desired wave intensity C and the interference wave intensity I for each antenna 10 on the basis of wireless parameters and electric wave propagation parameters in each antenna 10 illustrated in FIG. 13. Note that all equations indicated in the following description are described in terms of dB.

The wireless parameters indicate parameters related to wireless communication of the antenna 10. Examples thereof include transmission power, a maximum antenna gain, an antenna directivity pattern, and an electric wave spectrum characteristic. The transmission power indicates supply power of the antenna 10. The maximum antenna gain indicates a maximum gain obtained by the antenna 10. The antenna directivity indicates a gain at each angle of the antenna 10. The electric wave spectrum characteristic indicates a spectrum characteristic of the electric waves emitted by the antenna 10.

Moreover, the electric wave propagation parameters indicate parameters related to propagation of electric waves through wireless communication. The electric wave propagation parameters are, for example, a distance, an interference direction, a frequency channel, the amount of rainfall, humidity, and the presence of fog. The distance indicates a distance between the victim antenna and an interferer antenna (for example, a distance of a straight line connecting the center points of the victim antenna and the interferer antenna). The interference direction indicates a direction of the electric wave interference of the antenna 10.

The desired wave intensity C is calculated on the basis of the transmission power and the maximum antenna gain in the wireless parameters and electric wave propagation parameters such as the distance and the frequency channel on the assumption that the maximum value of the antenna directivity pattern is directed to the communication counterpart both on the transmission side and on the reception side. Note that a case in which the maximum value of the antenna directivity pattern is not ideally directed to the position of the communication counterpart and an angular error occurs is also assumed, and in such a case, calculation that takes the angular error into consideration may be performed. Note that there may be a case in which such orientation adjustment of the antenna directivity is performed through an input when the antenna is installed, a case in which the antenna such as a phased array antenna can electronically perform beam adjustment, and a case in which the wireless device itself performs automatic adjustment. In addition, the frequency channel is used in a case in which the amount of absorbed electric waves that may vary depending on the attenuation amount of absorption of oxygen/rainfall is taken into consideration or a case in which a loss (a free space propagation loss in the case of a free space) due to propagation is calculated.

The interference wave intensity I is calculated on the basis of the transmission power, the maximum antenna gain, the antenna directivity, and the electric wave spectrum characteristic in the wireless parameters and the distance, the frequency channel, and the interference direction in the electric wave propagation parameters. Note that the electric wave spectrum characteristic is used in a case in which leakage power to other channels (inter-channel leakage power) is taken into consideration. Specifically, the amount of interference that the victim antenna receives varies between a case in which the frequency channel used by the victim antenna for communication and the frequency channel of the interferer antenna are the same and a case in which the frequency channels are different. An example of the inter-channel leakage power is illustrated in FIG. 14. FIG. 14 is a diagram for explaining inter-channel leakage power. If the frequency channel of the victim antenna is defined as 1, and the channel of the interferer antenna is defined as 2, the inter-channel leakage power is $K(f_{1\text{-}2})$ in the drawing. Here, $f_{1\text{-}2}$ indicates a frequency difference between x and y.

In a case in which the frequency difference is 0, that is, in a case of the same channel, the frequency difference is $K(f_{1\text{-}1})$. In a case in which the frequency difference is not 0, the frequency difference is typically a negative value. Thus, the antenna control device 200 performs calculation of the interference wave intensity I in consideration of the difference in the frequency channels and the electric wave spectrum characteristic.

What is to be finally calculated by the antenna control device 200 is a CIR that is a ratio between the desired wave intensity C and total interference wave intensity $\Sigma I$ in each antenna 10, a CINR that is a ratio of the desired wave intensity C, the total interference wave intensity $\Sigma I$, and noise power N on the assumption that reception noise power of the wireless station on the victim side is N, and the like. Note that the noise power N is performance of the wireless station itself, can be derived regardless of wireless propagation from a reception specification and the like of the wireless station, and is constant regardless of allocation of the wireless station. Thus, a method for calculating the desired wave intensity C and the total interference wave intensity ΣI in the present embodiment will be described below. In order to calculate the values of the desired wave intensity C and the total interference wave intensity ΣI, the following values are used in the simulation.

Transmission power P

Maximum antenna gain Gmax

Antenna directivity gain $G_x(\theta_{r1-r2})$ ($\theta_{r1-r2}$ indicates an angle between the facing direction of an r1 antenna and a straight line direction connecting r1 to r2 antennas, and $G_x(\theta_{r1-r2})$ indicates a gain at the angle $\theta_{r1-r2}$ according to the antenna directivity pattern $G_x(\theta)$).

Propagation loss $L(f, R_{r1-r2})$ ($R_{r1-r2}$ indicates the propagation distance between the r1 antenna and the r2 antenna, and f indicates a frequency in use. $L(f_x, R_{x-y})$ is calculated by $L(f, R_{x-y})=20 \log((4\pi f_x R_{x-y})/c)$ in the case of a free space propagation loss, for example. Here, c indicates the speed of light. * Although L is calculated from multiple values such as the amount of rainfall or fog in addition to the distance R and the frequency f, only R and f are described here for simplification.)

Inter-channel leakage power K(f)

Note that the transmission power P and the maximum antenna gain Gmax are assumed to be known information. Also, the antenna directivity gain $G_x(\theta)$ varies depending on a transmission and reception angle and is thus calculated on the basis of known coordinates and installation angle information of each antenna 10. The propagation loss L(f,R) is calculated on the basis of known information such as a propagation distance and a frequency in use.

The equations of the desired wave intensity C and the interference wave intensity I can be derived as follows from the relationship of each antenna 10 illustrated in FIG. 13. FIGS. 15 and 16 are schematic views for explaining a method for deriving equations of the desired wave intensity C and the interference wave intensity I. FIG. 15(A) illustrates the antenna 10-C as a victim antenna, FIG. 15(B) illustrates the antenna 10-B2 as a victim antenna, FIG. 16(A) illustrates the antenna 10-A as a victim antenna, and FIG. 16(B) illustrates the antenna 10-B1 as a victim antenna.

As illustrated in FIG. 15(A), in a case in which the antenna 10-C is assumed to be a victim antenna, the antenna 10-B2 is a communication counterpart, and the antennas 10-A and 10-B1 are interferer antennas. The desired wave intensity C and the interference wave intensity I in the case in which the antenna 10-C is assumed to be a victim antenna are represented by Equations (1) to (3) below.

[Math. 1]

$$C_{B2 \to C} = P_{B2} + Gmax_{B2} + Gmax_C + L_{B2 \to C} \quad (1)$$

$$I_{B1 \to C} = P_{B1} + G_{B1} + G_C + L_{B1 \to C} \quad (2)$$

$$I_{A \to C} = P_A + G_A + G_C + L_{A \to C} \quad (3)$$

Note that subscripts in Equations (1) to (3) represent branch numbers of the antennas 10. In other equations, subscripts in the equations represent branch numbers of the antennas 10. For example, in Equation (1), $C_{B2 \to C}$ indicates the reception intensity of the desired wave from the antenna 10-B2 to the antenna 10-C. In Equation (1), $L(f_{B2}, R_{B2-c})$ indicates a propagation loss that varies depending on the frequency $f_{B2}$ of the antenna B2 and a propagation distance $R_{B2-c}$ between the antennas B2 and C. In Equation (1), $P_{B2}$ indicates transmission power of the antenna 10-B2. In Equation (1), $Gmax_{B2}$ indicates the maximum antenna gain of the antenna 10-B2. In Equation (1), $Gmax_C$ indicates the maximum antenna gain of the antenna 10-C.

In Equation (2), $I_{B1 \to C}$ indicates reception intensity of interference waves from the antenna 10-B1 to the antenna 10-C. In Equation (2), $G_{B1}(\theta_{B1-C})$ indicates a gain at the angle $\theta_{B1-C}$ in the directivity pattern $G_{B1}(\theta)$. Also, $\theta_{r1-r2}$ indicates an angle between the facing direction of the r1 antenna and the direction of the straight line connecting r1 to r2 antennas.

As illustrated in FIG. 15(B), in a case in which the antenna 10-B2 is assumed to be a victim antenna, the antenna 10-C is a communication counterpart, and the antennas 10-A and 10-B1 are interferer antennas. The desired wave intensity C and the interference wave intensity I in a case in which the antenna 10-B2 is assumed to be the victim antenna are represented by Equations (4) to (6) below.

[Math. 2]

$$C_{C \to B2} = P_C + Gmax_C + Gmax_{B2} + L_{C \to B2} \quad (4)$$

$$I_{B1 \to B2} = P_{B1} + G_{B1} + G_{B2} + L_{B1 \to B2} \quad (5)$$

$$I_{A \to B2} = P_A + G_A + G_{B2} + L_{A \to B2} \quad (6)$$

As illustrated in FIG. 16(A), in a case in which the antenna 10-A is assumed to be a victim antenna, the antenna 10-B1 is a communication counterpart, and the antennas 10-B2 and 10-C are interferer antennas. The desired wave intensity C and the interference wave intensity I in the case in which the antenna 10-A is a victim antenna are represented by Equations (7) to (9) below.

[Math. 3]

$$C_{B1 \to A} = P_{B1} + Gmax_{B1} + Gmax_A + L_{B1 \to A} \quad (7)$$

$$I_{B2 \to A} = P_{B2} + G_{B2} + G_A + L_{B2 \to A} \quad (8)$$

$$I_{C \to A} = P_C + G_C + G_A + L_{C \to A} \quad (9)$$

As illustrated in FIG. 16(B), in a case in which the antenna 10-B1 is a victim antenna, the antenna 10-A is a communication counterpart, and the antennas 10-B2 and 10-C are interferer antennas. The desired wave intensity C and the interference wave intensity I in the case in which the antenna 10-B1 is assumed to be a victim antenna are represented by Equations (10) to (12) below.

[Math. 4]

$$C_{A \to B1} = P_A + Gmax_A + Gmax_{B1} + L_{A \to B1} \quad (10)$$

$$I_{B2 \to B1} = P_{B2} + G_{B2} + G_{B1} + L_{B2 \to B1} \quad (11)$$

$$I_{C \to B1} = P_C + G_C + G_{B1} + L_{C \to B1} \quad (12)$$

Equations (1) to (12) described above are summarized for each reception antenna and are represented as Equations (13) to (20) below.

[Math. 5]

$$C_C = P_{B2} + Gmax_{B2} + Gmax_C + L_{B2 \to C} \quad (13)$$

$$C_{B2} = P_C + Gmax_C + Gmax_{B2} + L_{C \to B2} \quad (14)$$

$$C_A = P_{B1} + Gmax_{B1} + Gmax_A + L_{B1 \to A} \quad (15)$$

$$C_{B1} = P_A + Gmax_A + Gmax_{B1} + L_{A \to B1} \quad (16)$$

$$I_C = I_{B1 \to C} + I_{A \to C} = 10 \log\{10^{\{(P_{B1}+G_{B1}+G_C+L_{B1 \to C})/10\}} + 10^{\{(P_A+G_A+G_C+L_{A \to C})/10\}}\} \quad (17)$$

$$I_{B2}=I_{B1\to B2}+I_{A\to B2}=10\log\{10^{\wedge}\{(P_{B1}+G_{B1}+G_{B2}+L_{B1\to B2})/10\}+10^{\wedge}\{(P_A+G_A+G_{B2}+L_{A\to B2})/10\}\} \quad (18)$$

$$I_A=I_{B2\to A}+I_{C\to A}=10\log\{10^{\wedge}\{(P_{B2}+G_{B2}+G_A+L_{B2\to A})/10\}+10^{\wedge}\{(P_C+G_C+G_A+L_{C\to A})/10\}\} \quad (19)$$

$$I_{B1}=I_{B2\to B1}+I_{C\to B1}=10\log\{10^{\wedge}\{(P_{B2}+G_{B2}+G_{B1}+L_{B2\to B1})/10\}+10^{\wedge}\{(P_C+G_C+G_{B1}+L_{C\to B1})/10\}\} \quad (20)$$

The antenna control device 200 calculates the desired wave intensity C and the interference wave intensity I of each antenna 10 using the aforementioned equations and finally calculates the CIR for each antenna 10. Further, the antenna control device 200 may calculate CINR according to CINR=C [dB]−10×log 10($10^{(I+N)/10}$) using reception noise power N of the wireless station on the victim side.

Next, Step 2 (calculation of a margin) among the steps performed by the antenna control device 200 will be described in detail.

First, if margins of the CIR, the interference wave intensity I, and the CINR are defined as CIR_mar, I_mar, and CINR_mar, respectively, and the margins of the required CIR and the desired interference wave intensity are defined as CIR_req and I_req, respectively, the margins of each antenna 10 illustrated in FIG. 13 are represented by Equations (21) to (28) below.

[Math. 6]

$$CIR_{c\_mar} = P_{B2} + Gmax_{B2} + Gmax_C + L_{B2\to C} - \{10\log\{10^{\wedge}\{(P_{B1}+G_{B1}+G_C+L_{B1\to C})/10\} + 10^{\wedge}\{(P_A+G_A+G_C+L_{A\to C})/10\}\}\} - CIR_{C\_req} \quad (21)$$

$$CIR_{B2\_mar} = P_C + Gmax_C + Gmax_{B2} + L_{C\to B2} - \{10\log\{10^{\wedge}\{(P_{B1}+G_{B1}+G_{B2}+L_{B1\to B2})/10\} + 10^{\wedge}\{(P_A+G_A+G_{B2}+L_{A\to B2})/10\}\}\} - CIR_{B2\_req} \quad (22)$$

$$CIR_{A\_mar} = P_{B1} + Gmax_{B1} + Gmax_A + L_{B1\to A} - \{10\log\{10^{\wedge}\{(P_{B2}+G_{B2}+G_A+L_{B2\to A})/10\} + 10^{\wedge}\{(P_C+G_C+G_A+L_{C\to A})/10\}\}\}CIR_{A\_req} \quad (23)$$

$$CIR_{B1\_mar} = P_A + Gmax_A + Gmax_{B1} + L_{A\to B1} - \{10\log\{10^{\wedge}\{(P_{B2}+G_{B2}+G_{B1}+L_{B2\to B1})/10\} + 10^{\wedge}\{(P_C+G_C+G_{B1}+L_{C\to B1})/10\}\}\} - CIR_{B1\_req} \quad (24)$$

$$I_{C\_mar} = I_{C\_req} - \{10\log\{10^{\wedge}\{(P_{B1}+G_{B1}+G_C+L_{B1\to C})/10\} + 10^{\wedge}\{(P_A+G_A+G_C+L_{A\to C})/10\}\}\} \quad (25)$$

$$I_{B2\_mar} = I_{B2\_req} - \{10\log\{10^{\wedge}\{(P_{B1}+G_{B1}+G_{B2}+L_{B1\to B2})/10\} + 10^{\wedge}\{(P_A+G_A+G_{B2}+L_{A\to B2})/10\}\}\} \quad (26)$$

$$I_{A\_mar} = I_{A\_req} - \{10\log\{10^{\wedge}\{(P_{B2}+G_{B2}+G_A+L_{B2\to A})/10\} + 10^{\wedge}\{(P_C+G_C+G_A+L_{C\to A})/10\}\}\} \quad (27)$$

$$I_{B1\_mar} = I_{B1\_req} - \{10\log\{10^{\wedge}\{(P_{B2}+G_{B2}+G_{B1}+L_{B2\to B1})/10\} + 10^{\wedge}\{(P_C+G_C+G_{B1}+L_{C\to B1})/10\}\}\} \quad (28)$$

FIG. 17 is a flowchart illustrating a flow of a reception intensity calculation process performed by an antenna control device in the related art.

The reception intensity calculation unit 2003 calculates the desired wave intensity C of each antenna 10 on the basis of the parameter storage unit 2001. Also, the interference intensity calculation unit 2002 calculates the interference wave intensity I of each antenna 10 on the basis of the parameter storage unit 2001 (Step S1001).

The estimation of the amount of interference and the method for calculating the CIR and the CINR using the amount of interference have been described above. In a case in which transmission power control, for example, is performed as a measure against interference using the CIR and the CINR, it is possible to calculate margins of the required CIR, the required CINR, and the like and to reduce the transmission power on the basis of the margins. It is thus possible to reduce the amount of interference in the entire system and to perform interference compensation.

CITATION LIST

Patent Literature

Patent Literature 1: JP 2011-146850 A

SUMMARY OF THE INVENTION

Technical Problem

As described above, because a combination of all the wireless stations other than the communication counterparts are calculated as interference waves in the interference calculation in the related art as represented by Equations (2), (3), (5), (6), (8), (9), (11), and (12), it is necessary to perform interference calculations such that the number thereof corresponds to a square of the number of wireless stations, and thus the number of combinations of the interference sources to be considered steeply increases as the number of wireless stations increases. In addition, for example, to control transmission power after interference calculation, an optimal value for the transmission power may be determined by an optimization algorithm that extracts the optimal value by gradually changing the transmission power, but a long calculation time means that it takes a long time in each step of the algorithm, and thus it takes a long time to converge the optimization calculation. As described above, the calculation time for the interference calculation increases by a square of the number of antennas in the related art, and there is a problem in which it takes a significantly long time as the calculation time in a case in which parameters such as transmission power are optimized in accordance with a result of interference, for example.

Means for Solving the Problem

The present invention provides an interference amount arithmetic operation method that reduces the number of interference calculations to solve the aforementioned problem. An aspect of the present invention provides an interference wave arithmetic operation method performed by a wireless communication system including a plurality of antennas including: determining an interferer antenna on the basis of information regarding directivity, a position, and an orientation of each of the plurality of antennas; and calculating interference wave reception intensity of a victim antenna using an interference wave from the determined interferer antenna.

An aspect of the present invention provides the interference wave arithmetic operation method in which, in determining the interferer antenna, threshold determination is performed on each interferer antenna in accordance with station coordinates and a station direction.

An aspect of the present invention provides the interference wave arithmetic operation method in which, in determining the interferer antenna, a threshold value for determining the interferer antenna is determined on the basis of one or both of an angle of the victim antenna and a distance between the victim antenna and the interferer antenna, and an antenna with a value within the threshold value is determined to be the interferer antenna.

An aspect of the present invention provides the interference wave arithmetic operation method in which, in determining the interferer antenna, an antenna that satisfies one or both of a first condition and a second condition is determined to be the interferer antenna, the first condition being a condition that the antenna is positioned in a beam direction of the victim antenna, or the victim antenna is positioned in a beam direction of the antenna, or the victim antenna and the antenna are positioned in mutual beam directions, the second condition being a condition that a distance between the victim antenna and the antenna is equal to or less than a threshold value.

An aspect of the present invention provides the interference wave arithmetic operation method further including: controlling transmission power of at least one arbitrary antenna of the victim antenna and the interferer antenna.

An aspect of the present invention provides the interference wave arithmetic operation method in which, in controlling the transmission power, the transmission power is controlled by performing one or more iterative calculations of transmission power of an antenna that is a communication counterpart of an antenna with communication quality equal to or less than a predetermined value among the victim antenna and the interferer antenna or transmission power of an interferer antenna that serves as a maximum interference source according to an equation for formulating the amount of interference of the interferer antenna.

An aspect of the present invention provides an interference wave arithmetic operation device in a wireless communication system including a plurality of antennas, the device including: an interference target determination unit configured to determine an interferer antenna on the basis of information regarding directivity, a position, and an orientation of each of the plurality of antennas; and a reception intensity calculation unit configured to calculate interference wave reception intensity of a victim antenna using an interference wave from the determined interferer antenna.

An aspect of the present invention provides a computer program for causing a computer to execute the interference wave arithmetic operation method.

Effects of the Invention

According to the present invention, it is possible to reduce the amount of arithmetic operation in relation to derivation of an electric force of an interference wave by excluding the amount of interference from an interference source that does not substantially contribute to a value of a total amount of interference from the arithmetic operation due to the small amount of received interference in calculation of the sum (total amount of interference) of the amount of received interference.

BRIEF DESCRIPTION OF DRAWINGS

FIG. 2 is a set of diagrams for explaining an antenna using a millimeter wave FWA.
FIG. 6 is a diagram illustrating a specific example of a parameter table.

DESCRIPTION OF EMBODIMENTS

Embodiments of the present invention will be described below with reference to the drawings.

First Embodiment

Figure 1:
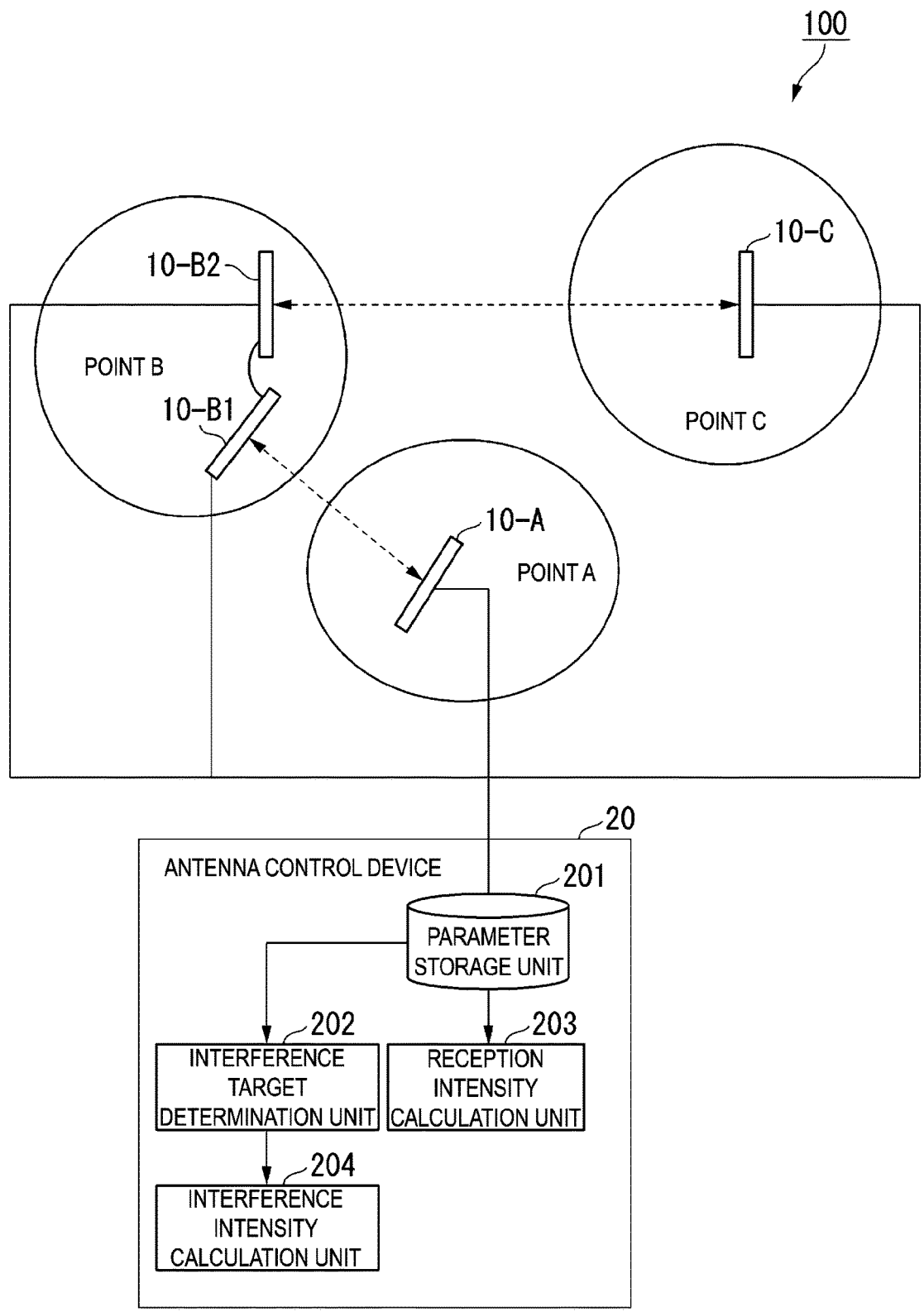
FIG. 1 is a configuration diagram illustrating a system configuration of a wireless communication system according to a first embodiment.

FIG. 1 is a configuration diagram illustrating a system configuration of a wireless communication system 100 according to a first embodiment. The wireless communication system 100 includes a plurality of antennas 10 (10-A, 10-B1, 10-B2, and 10-C) and an antenna control device 20. The plurality of antennas 10 and the antenna control device 20 are connected to each other in a communicable state in a wired manner or through wireless communication prepared separately from the system. Note that, although FIG. 1 illustrates a configuration in which the wireless communication system 100 includes four antennas 10, it is only necessary for the wireless communication system 100 to include three or more antennas 10.

The antenna 10 is an antenna using a millimeter wave FWA. The antenna control device 20 calculates reception intensity of a victim antenna. The antenna control device 20 is configured using an information processing device such as a laptop PC, a personal computer, a smartphone, a mobile phone, a tablet terminal, a virtual machine on a cloud, or the like.

FIG. 2 is a diagram for explaining an antenna using a millimeter wave FWA. FIG. 2(A) is a diagram illustrating an antenna gain at each antenna angle using a millimeter wave FWA, and FIG. 2(B) is a diagram illustrating the attenuation amount of an electric wave at each frequency. As illustrated in FIGS. 2(A) and 2(B), the antenna using the millimeter wave FWA has sharp directivity of the antenna gain. Also, because an oxygen absorption loss is also high in a case in which a 60 GHz bandwidth used for WiGig or the like is used in the millimeter wave bandwidth, and a propagation loss in accordance with the distance is larger than that at other frequencies, the amount of interference from antennas located far away contributes less to the total amount of interference. The interferer antenna 10 is thus considered to be affected by the interference wave in a case in which any or a combination of any of the following first condition, second condition, and third condition is satisfied. Note that the drawing in FIG. 2(B) is a citation of the following reference literature.

(Reference literature: "P. 676: Attenuation by atmospheric gases, "FIG. 5, ITU-R Recommendation P. 676-11 (September 2016)
(URL: https://www.itu.int/rec/R-REC-P.676-11-201609-I/en))

(First condition): The interferer antenna is positioned in a beam direction of the victim antenna, and the victim antenna is positioned in a beam direction of the interferer antenna, or the interferer antenna is positioned in the beam direction of the victim antenna, or the victim antenna is positioned in the beam direction of the interferer antenna.

Here, the beam direction is, for example, a region within a range at a predetermined angle with reference to a main beam direction, and the predetermined angle includes for example, an angle at which the antenna directivity gain drops by 3 dB, or in a generalized manner, an angle at which the antenna directivity gain drops XX dB.

(Second condition): The distance between antennas is equal to or less than a threshold value, that is, antennas 10 are close to each other.

The above description corresponds to the exemplary embodiment according to the third aspect of the present invention.

Figure 3:
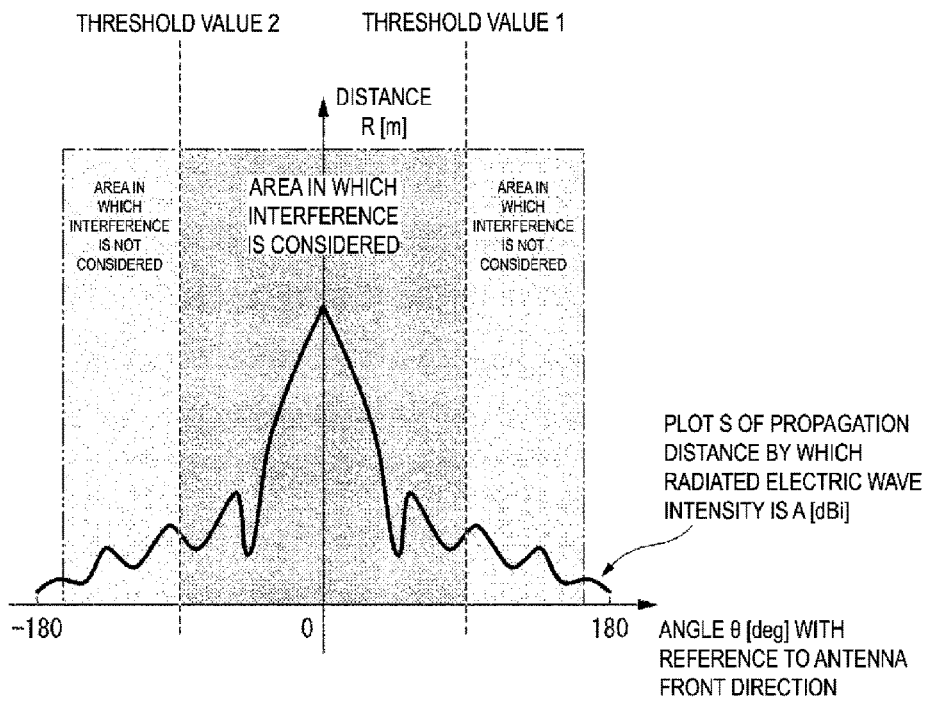
FIG. 3 is a diagram for explaining a first condition.

FIG. 3 is a diagram for explaining the first condition. As illustrated in FIG. 3, the threshold value of the angle at which the interference is to be considered is determined in accordance with the angle with reference to the front direction of the antenna 10. For example, it is determined that interference in an area outside the angle range of 20 degrees in the positive direction to 25 degrees in the negative direction when seen from the antenna 10 is not considered as interference. Note that, although FIG. 3 illustrates the angles in a two-dimensional plane, threshold values may be determined by an angle θ in the horizontal direction and an angle φ in the vertical direction through expansion to a three-dimensional plane.

Figure 4:
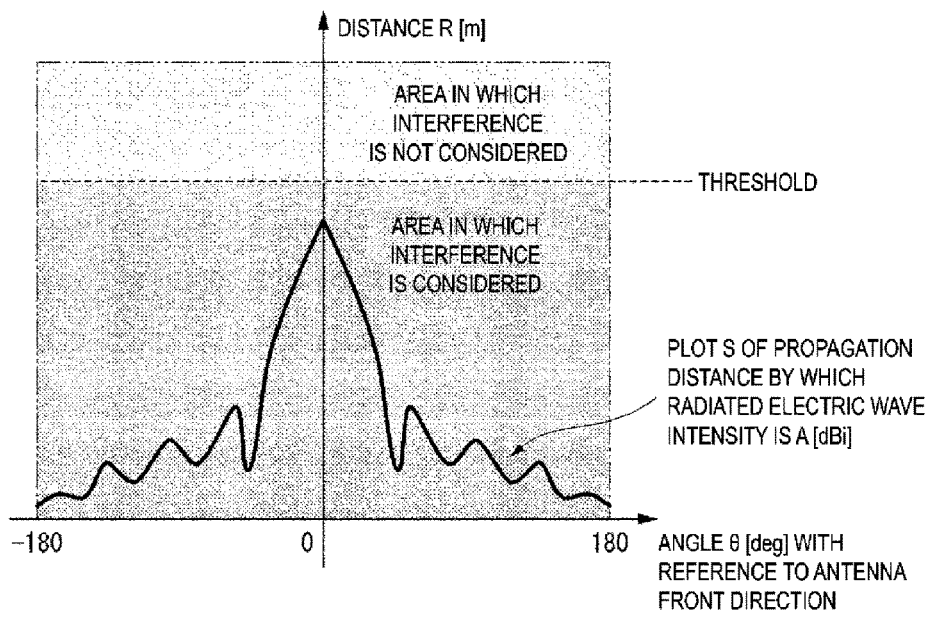
FIG. 4 is a diagram for explaining a second condition.

FIG. 4 is a diagram for explaining the second condition. As illustrated in FIG. 4, a threshold value for the distance in which interferences are to be considered is determined in accordance with the distance of the main beam of the victim antenna. For example, interferences in an area located 50 m or more far away from the victim antenna are determined not to be considered as interferences.

Also, a condition obtained by generalizing the first condition and the second condition may be used as a "third condition".

Figure 5:
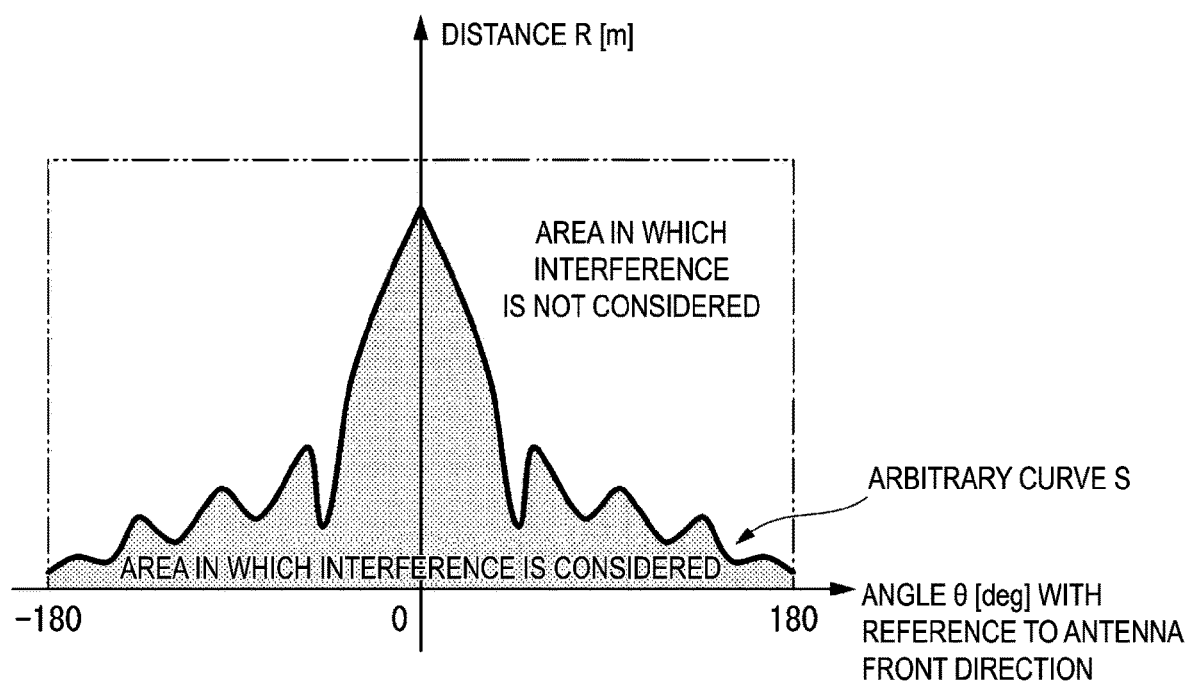
FIG. 5 is a diagram for explaining a third condition.

FIG. 5 is a diagram for explaining the third condition. As illustrated in FIG. 5, an area in which interferences are to be considered is determined in accordance with an arbitrary curve S. For example, "the propagation distance $R_A(\theta)$ at which the propagation electric wave intensity or the reception electric wave intensity becomes A [dBm]" is obtained at each angle θ, and a curve obtained by connecting $R_A(\theta)$ is defined as S. Here, the propagation electric wave intensity is an electric wave intensity when a signal transmitted from the antenna is propagated in a space and is a value that varies due to a propagation distance, a frequency of the electric wave, humidity of a propagation path, oxygen concentration, and the like, and the reception electric wave intensity is a value that takes the propagation electric wave intensity and further an antenna gain of the reception antenna into consideration. Also, an area in which interference to be considered with a threshold value T calculated on the basis of the obtained curve S is determined. Note that the threshold value T may be the same value as the curve S (T=S) or may be defined as a function T=f(S) in accordance with S. As an example of a case in which the function f(S) in accordance with S is used, the following method is conceivable: the propagation distance propagation distance $R_A(\theta)$ at which the reception electric wave intensity is A is obtained, a margin of further 10 meters is added on the assumption of an error of the parameters used to calculate $R_A(\theta)$, and the threshold T is set to be $T=f(S)=R_A(\theta)+10$ meters, and a method of determining that interferences in an area outside a boundary closed region defined by T are not considered as interferences.

The above description corresponds to the exemplary embodiment according to the second aspect of the present invention.

Returning to FIG. 1, a relationship of each antenna 10 will be described.

The antenna 10-A is positioned in the beam direction of the antenna 10-B1.

The antenna 10-A is separated from the antennas 10-B2 and 10-C by distances that are greater than the threshold value.

The antenna 10-B1 is positioned in the beam direction of the antenna 10-A.

The antenna 10-B1 is at a distance of equal to or less than the threshold value from the antenna 10-B2.

The antenna 10-B2 is at a distance of equal to or less than the threshold value from the antenna 10-B1.

The antenna 10-B2 is positioned in the beam direction of the antenna 10-A.

The antenna 10-B2 is positioned in the beam direction of the antenna 10-C.

The antenna 10-C is positioned in the beam direction of the antenna 10-B2.

The antenna 10-C is separated from the antennas 10-A and 10-B2 at distances that are greater than the threshold value.

In the present invention, the antenna control device 20 deletes the amount of arithmetic operation by not including the interference waves from the antennas 10 that satisfies none of the first condition, the second condition, and the third condition in the arithmetic operation. In other words, in the present invention, the antenna control device 20 reduces the number of interferer antennas to be considered by performing threshold determination on each of the interferer antennas. This description corresponds to an exemplary embodiment according to the second aspect of the present invention. In a case in which the antenna 10-B2 is assumed to be a victim antenna in the disposition relationship of the antennas 10 illustrated in FIG. 1, the distance between the antenna 10-B1 and the antenna 10-B2 is equal to or less than the threshold value. Thus, the interference wave from the antenna 10-B1 to the antenna 10-B2 satisfies the second condition. Also, since the antenna 10-B2 is in the beam direction of the antenna 10-A, the interference wave from the antenna 10-A to the antenna 10-B2 satisfies the first condition.

On the other hand, in a case in which the antenna 10-A is assumed to be a victim antenna in the disposition relationship of the antennas 10 illustrated in FIG. 1, the separation distances from the antenna 10-B2 and the antenna 10-C to the antenna 10-A are greater than the threshold value. Further, the antenna 10-A is not positioned in the beam directions of the antenna 10-B2 and the antenna 10-C. In a case in which the antenna 10-A is assumed to be a victim antenna, the antenna 10-B2 and the antenna 10-C satisfies neither the first condition nor the second condition.

If the first condition and the second condition are applied to Equations (21) to (28), it is possible to represent Equations (29) to (36) or Equations (37) to (44) below.

[Math. 7]

$$CIR_{c\_mar} = P_{B2} + Gmax_{B2} + Gmax_C + L_{B2 \to C} - CIR_{C\_req} \quad (29)$$

$$CIR_{B2\_mar} = P_C + Gmax_C + Gmax_{B2} + L_{C \to B2} - \quad (30)$$
$$\{10\log\{10^\wedge\{(P_{B1} + G_{B1} + G_{B2} + L_{B1 \to B2})/10\} + $$
$$10^\wedge\{(P_A + G_A + G_{B2} + L_{A \to B2})/10\}\}\} - CIR_{B2\_req}$$

$$CIR_{A\_mar} = P_{B1} + Gmax_{B1} + Gmax_A + L_{B1 \to A} - CIR_{A\_req} \quad (31)$$

$$CIR_{B1\_mar} = P_A + Gmax_A + Gmax_{B1} + L_{A \to B1} - \quad (32)$$
$$\{10\log\{10^\wedge\{(P_{B2} + G_{B2} + G_{B1} + L_{B2 \to B1})/10\} + $$
$$10^\wedge\{(P_C + G_C + G_{B1} + L_{C \to B1})/10\}\}\} - CIR_{B1\_req}$$

$$I_{C\_mar} = I_{C\_req} \quad (33)$$

$$I_{B2\_mar} = I_{B2\_req} - \{10\log\{10^\wedge\{(P_{B1} + G_{B1} + G_{B2} + L_{B1 \to B2})/10\} + \quad (34)$$
$$10^\wedge\{(P_A + G_A + G_{B2} + L_{A \to B2})/10\}\}\}$$

$$I_{A\_mar} = I_{A\_req} \quad (35)$$

$$I_{B1\_mar} = I_{B1\_req} - \{10\log\{10^\wedge\{(P_{B2} + G_{B2} + G_{B1} + L_{B2 \to B1})/10\} + \quad (36)$$
$$10^\wedge\{(P_C + G_C + G_{B1} + L_{C \to B1})/10\}\}\}$$

[Math. 8]

$$CIR_{c\_mar} = P_{B2} + Gmax_{B2} + Gmax_C + L_{B2 \to C} - CIR_{C\_req} \quad (37)$$

$$CIR_{B2\_mar} = P_C + Gmax_C + Gmax_{B2} + L_{C \to B2} - \quad (38)$$
$$10\log\{10^\wedge\{(P_{B1} + G_{B1} + G_{B2} + L_{B1 \to B2})/10\}\} - CIR_{B2\_req}$$

$$CIR_{A\_mar} = P_{B1} + Gmax_{B1} + Gmax_A + L_{B1 \to A} - CIR_{A\_req} \quad (39)$$

$$CIR_{B1\_mar} = P_A + Gmax_A + Gmax_{B1} + L_{A \to B1} - \quad (40)$$
$$10\log\{10^\wedge\{(P_{B2} + G_{B2} + G_{B1} + L_{B2 \to B1})/10\}\} - CIR_{B1\_req}$$

$$I_{C\_mar} = I_{C\_req} \quad (41)$$

$$I_{B2\_mar} = I_{B2\_req} - (P_{B1} + G_{B1} + G_{B2} + L_{B1 \to B2}) \quad (42)$$

$$I_{A\_mar} = I_{A\_req} \quad (43)$$

$$I_{B1\_mar} = I_{B1\_req} - (P_{B2} + G_{B2} + G_{B1} + L_{B2 \to B1}) \quad (44)$$

Note that Equations (29) to (36) are equations in a case in which the interferer antenna is positioned in the beam direction of the victim antenna or the victim antenna is positioned in the beam direction of the interferer antenna to satisfy the first condition. Equations (37) to (44) are equations in a case in which the interferer antenna is positioned in the beam direction of the victim antenna and the victim antenna is positioned in the beam direction of the interferer antenna to satisfy the first condition.

As represented by Equations (29) to (36) and Equations (37) to (44), it is not necessary to calculate the interference waves that satisfy neither the first condition nor the second condition, and it is thus possible to reduce the amount of arithmetic operation. Also, the antennas 10 that satisfy any one or both of the first condition and the second condition are considered to be only some of the antennas in the station area. Thus, in a case in which the number of antennas having stations placed in a large-scale network or the like is large or in a case in which the stations are densely placed, an effect of reducing more items can be expected.

Because a part of calculation of the interference power is omitted for the CIR derived by this method, the CIR is estimated to be higher than an actual CIR. However, because the amount of received interference from the interference sources other than a small amount of main interference sources is significantly small in the calculation of the total amount of interference and has substantially no influences on the CIR, there may be a case in which these can be ignored in derivation of an optimal MCS and the transmission power. The present invention focuses on this point and achieves reduction of the amount of arithmetic operation in the entire CIR calculation by deriving a necessity of the calculation of the CIR through simple calculation and omitting strict calculation of the interference power.

Next, a functional configuration of the antenna control device 20 will be described in detail.

The antenna control device 20 includes a central processing unit (CPU), a memory, an auxiliary storage device, and the like connected to each other via a bus and executes a control program. Through the execution of the control program, the antenna control device 20 functions as a device including a parameter storage unit 201, an interference target determination unit 202, a reception intensity calculation unit 203, and an interference intensity calculation unit 204. Note that all or some functions of the antenna control device 20 may be implemented using hardware such as an application specific integrated circuit (ASIC), a programmable logic device (PLD), or a field programmable gate array (FPGA). In addition, the control program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. In addition, the control program may be transmitted and received through an electrical communication line.

The parameter storage unit 201 stores a parameter table and an interference information table. Information regarding parameters of the antennas 10 is registered in the parameter table. Also, information related to interferences is registered in the interference information table. FIG. 6 is a diagram illustrating a specific example of the parameter table.

In FIG. 6, the parameter table has a plurality of records indicating information regarding parameters of the antennas 10. The records have values of wireless parameters, installation parameters, and antenna IDs of communication counterparts. The wireless parameters indicate parameters related to wireless communication of the antenna 10. Values of a transmission power, a maximum antenna gain, an antenna directivity pattern, and an electric wave spectrum characteristic are registered as wireless parameters in the parameter table.

The transmission power indicates a power for transmission supplied to each antenna 10. The maximum antenna gain indicates a maximum gain obtained by the antenna 10. The antenna directivity pattern indicates a value of a gain at each angle of each antenna, and in a case in which radiation is performed at an angle deviating from the antenna front direction, the antenna directivity pattern indicates the emitted power and the amount of reception power reduced by the antenna directivity pattern in a case in which an electric wave is received from the deviating angle. The electric wave spectrum characteristic indicates a spectrum characteristic of the electric wave emitted by each antenna 10 and indicates the amount of reduction as compared with the amount when the same channel is used at the time of calculating an interference power between antennas that use different frequency channels, for example.

Values of the installation position and the installation angle of each antenna 10 are registered as the installation parameters. The installation position indicates the location where each antenna 10 is installed. The installation position may be represented by a latitude and a longitude. The installation angle indicates installation of each antenna 10.

The antenna ID of the communication counterpart indicates identification information of each antenna 10 communicating with each antenna 10 registered in the item of the antenna ID.

Figure 7:
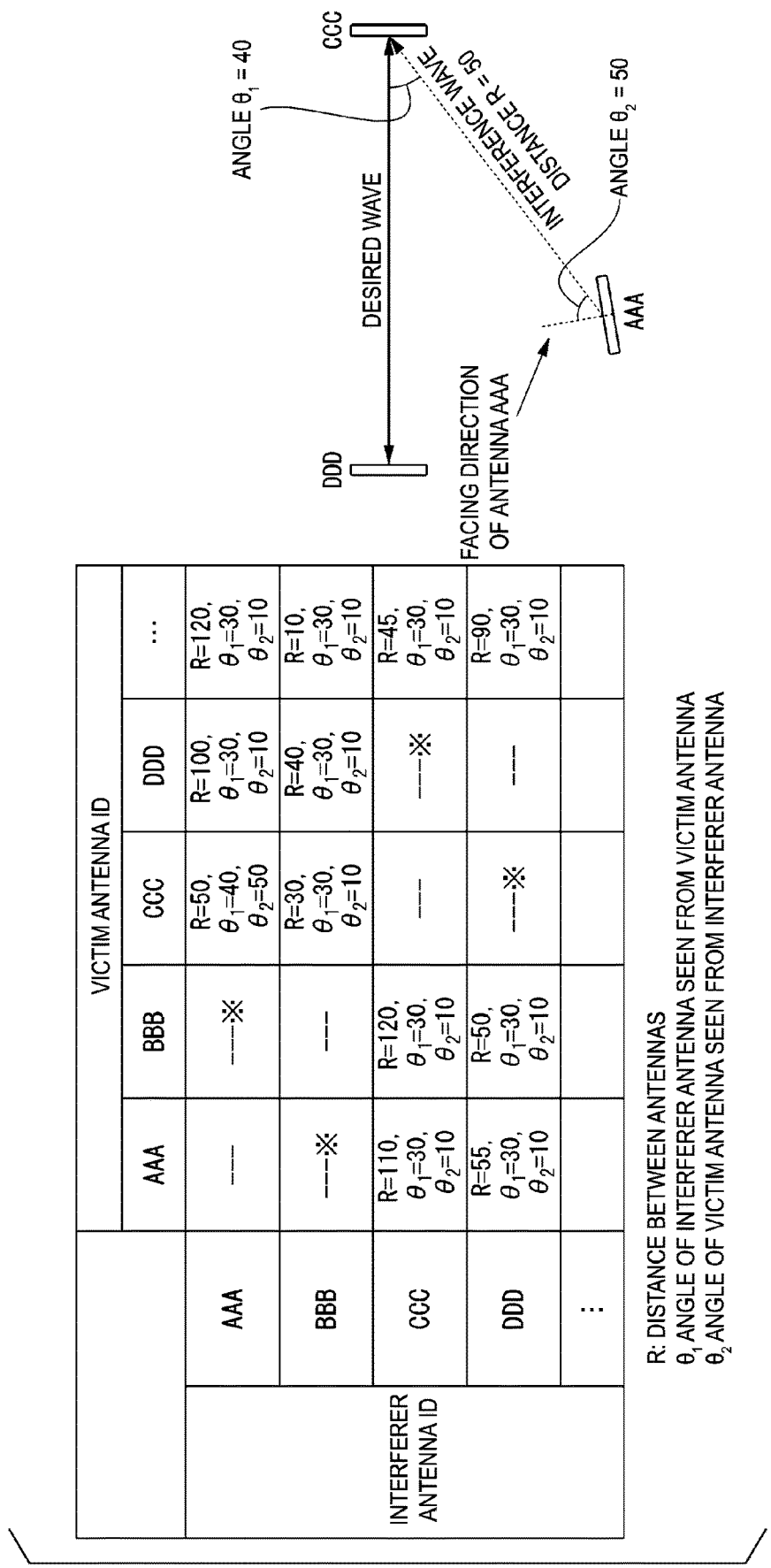
FIG. 7 is a set of diagrams illustrating a specific example of an interference information table.

FIG. 7 is a diagram illustrating a specific example of the interference information table. In FIG. 7, information related to interferences between victim antenna IDs and interferer antenna IDs is registered in the interference information table. In the interference information table, the cell in which "---" is described indicates blank, and in a case in which an interference wave directed from an antenna AAA to an antenna AAA is not considered as an interference wave, for example, "---" is described in the corresponding cell. Also, "---\*" indicates that the corresponding item is a desired signal coming from the communication counterpart is thus not considered as an interference and is left as blank. In each of other cells, information indicating relationships between the interferer antennas and the victim antennas is stored. Information to be stored includes, for example, the following information.

The distance between each interferer antenna and each victim antenna

The angle of each interferer antenna when seen from each victim antenna

The angle of each victim antenna when seen from each interferer antenna

Returning to FIG. 1, description will be continued.

The interference target determination unit 202 determines an interferer antenna on the basis of the parameter table and the interference information table.

The reception intensity calculation unit 203 calculates desired wave intensity C and interference wave intensity I of each antenna 10 and calculates a CIR for each antenna 10. For example, the reception intensity calculation unit 203 calculates reception intensity (interference wave intensity I) of the interference waves at a victim antenna using the interference waves from its interferer antennas to the victim antenna. For example, the reception intensity calculation unit 203 calculates reception intensity (desired wave intensity C) of the desired waves at a victim antennas using the desired waves from the antenna 10 that is a communication counterpart of the victim antenna.

The interference intensity calculation unit 204 calculates interference intensity of the interferer antennas.

Figure 8:
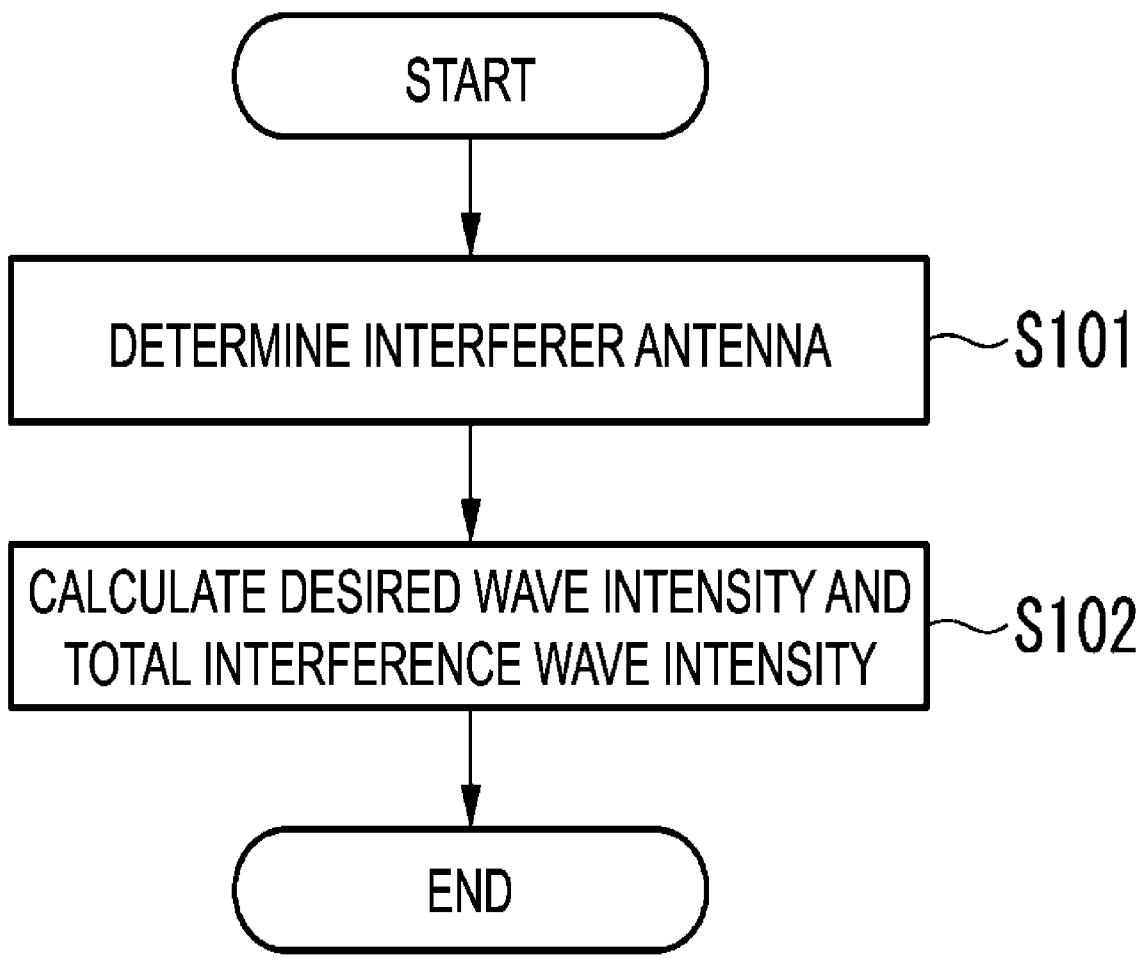
FIG. 8 is a flowchart illustrating a flow of a process performed by an antenna control device according to the first embodiment.

FIG. 8 is a flowchart illustrating a flow of the process performed by the antenna control device 20 according to the first embodiment.

The interference target determination unit 202 determines an interferer antenna on the basis of the parameter table and the interference information table (Step S101). Specifically, the interference target determination unit 202 determines that the antenna 10 that satisfies any or a combination of any of the first condition, the second condition, and the third condition to be the interferer antenna on the basis of information such as directivity, the position, and the orientation of each antenna registered in the parameter table, the distance between the interferer antenna and the victim antenna, the angle of the interferer antenna when seen from the victim antenna, and the angle of the victim antenna when seen from the interferer antenna registered in the interference information table. The interference target determination unit 202 outputs information regarding the determined interferer antenna to the reception intensity calculation unit 203.

The reception intensity calculation unit 203 calculates the desired wave intensity C and the interference wave intensity I of each antenna 10 on the basis of the parameter table and information regarding the antenna 10 that is notified to be the interferer antenna from the interference target determination unit 202. Specifically, the reception intensity calculation unit 203 derives an equation in which each antenna 10 is assumed to be a victim antenna first. Next, the reception intensity calculation unit 203 deletes items related to the antennas 10 that are neither the victim antenna nor the interferer antenna from the derived equation. Then, the reception intensity calculation unit 203 calculates the desired wave intensity C and the interference wave intensity I on the basis of the equation after the items related to the antennas 10 that are neither the victim antenna nor the interferer antenna are deleted. Thereafter, the reception intensity calculation unit 203 calculates the CIR for each antenna 10 on the basis of the calculated desired wave intensity C and the interference wave intensity I (Step S102). Also, the reception intensity calculation unit 203 calculates the CINR for each antenna 10 on the basis of the calculated desired wave intensity C and the interference wave intensity I.

According to the antenna control device 20 configured as described above, the interferer antenna is determined on the basis of information regarding the directivity, the position, and the orientation of each antenna 10, and the reception intensity of the interference wave at the victim antenna is calculated using the interference wave from the determined interferer antenna. In this manner, the interference waves of the interferer antennas 10 that have less or no influences on the victim antenna are not used for the calculation of the reception intensity. In this manner, the antenna control device 20 reduces the number of interferer antennas used for the arithmetic operation. It is thus possible to reduce the amount of arithmetic operation of the interference waves.

Also, the antenna control device 20 determines the interferer antenna 10 positioned in the beam direction of the victim antenna, or the antenna 10 that satisfies any or a combination of any of the first condition, the second condition, and the third condition that the victim antenna is positioned in the beam direction of the interferer antenna 10 to be the interferer antenna. In this manner, the antenna control device 20 does not use, for the calculation of the reception intensity, the interference waves from the antennas 10 that satisfies none of the first condition, the second condition, and the third condition. In this manner, the antenna control device 20 reduces the number of interference sources (interferer antennas) used for the arithmetic operation. It is thus possible to reduce the amount of arithmetic operation of the interference waves.

In addition, the antenna control device 20 determines the antenna 10 that is the interferer antenna 10 positioned in the beam direction of the victim antenna and that satisfies any one or both of the first condition and the second condition that the victim antenna is positioned in the beam direction of the interferer antenna 10 to be the interferer antenna. In this manner, the antenna control device 20 does not use the interference waves from the antennas 10 that satisfies neither the first condition nor the second condition for the calculation of the reception intensity. In this manner, the antenna control device 20 reduces the number of interference sources used for the arithmetic operation. It is thus possible to reduce the amount of arithmetic operation of the interference waves.

The antenna control device 20 according to the aforementioned first embodiment corresponds to the exemplary embodiment according to the first, eighth and ninth aspects of the present invention.

Second Embodiment

In a second embodiment, the antenna control device 20 performs transmission power control. The system configuration in the second embodiment is similar to that in the first embodiment, and the description thereof will thus be omitted.

An antenna control device 20a controls a transmission power of each antenna 10 in a wired or wireless manner or using wireless connection prepared separately from the system.

Figure 9:
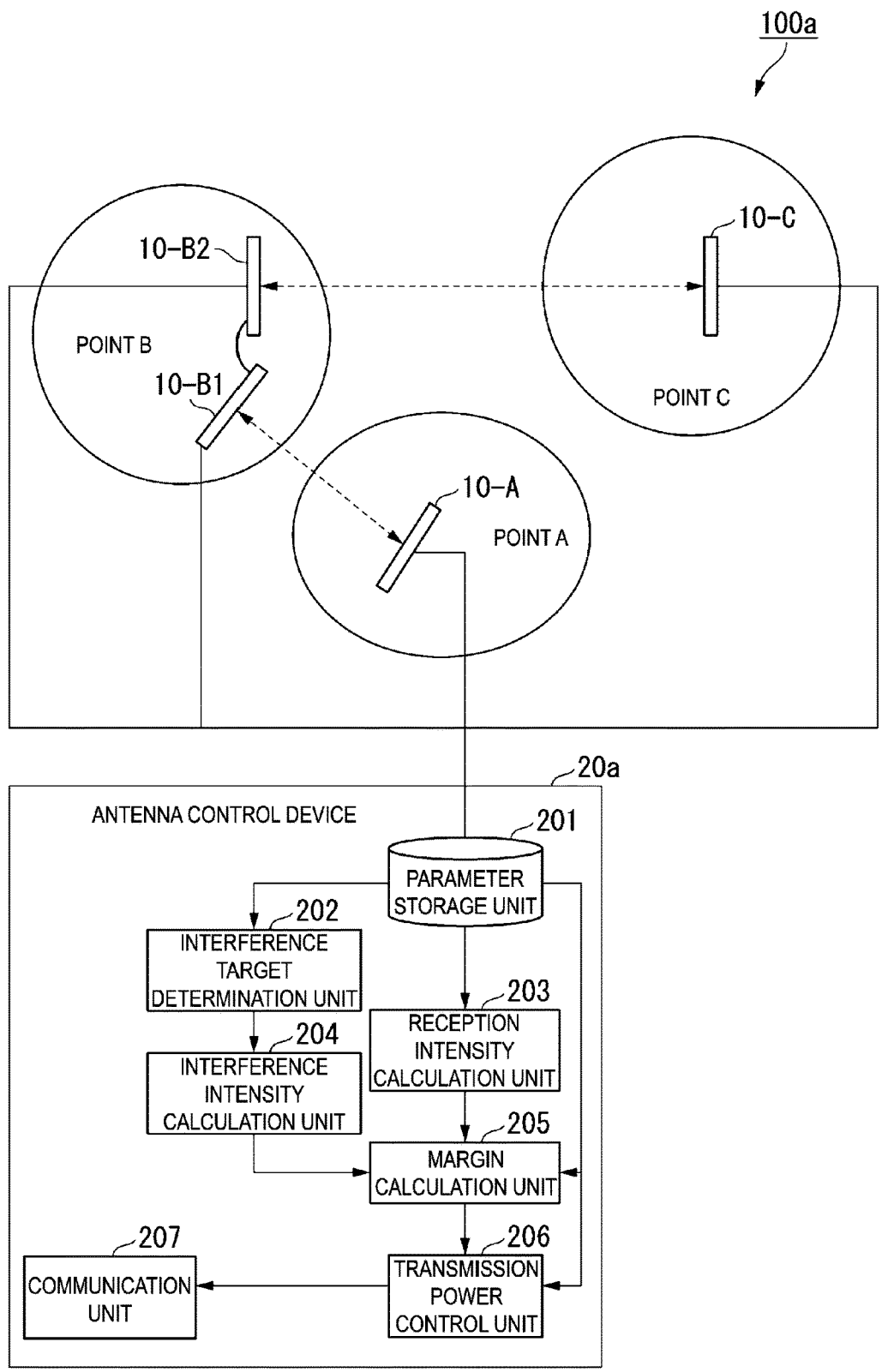
FIG. 9 is a configuration diagram illustrating a system configuration of a wireless communication system according to a second embodiment.

FIG. 9 is a configuration diagram illustrating a system configuration of a wireless communication system 100a according to the second embodiment, which is an embodiment according to the fifth aspect of the present invention.

The wireless communication system 100a is similar to the wireless communication system 100 according to the first embodiment other than that the configuration of the antenna control device 20a is different. Therefore, only the antenna control device 20a will be described.

The antenna control device 20a includes a CPU, a memory, an auxiliary storage device, and the like connected to each other via a bus and executes a control program. Through the execution of the control program, the antenna control device 20a functions as a device including a parameter storage unit 201, an interference target determination unit 202, a reception intensity calculation unit 203, an interference intensity calculation unit 204, a margin calculation unit 205, a transmission power control unit 206, and a communication unit 207. Note that all or some of the functions of the antenna control device 20a may be implemented using hardware such as an ASIC, a PLD, or an FPGA. In addition, the control program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. In addition, the control program may be transmitted and received through an electrical communication line.

The antenna control device 20a has a different configuration from that of the antenna control device 20 in that the antenna control device 20a newly includes the margin calculation unit 205, the transmission power control unit 206, and the communication unit 207. The other configuration of the antenna control device 20a is similar to that of the antenna control device 20. Thus, the description of the entire antenna control device 20a will be omitted, and the margin calculation unit 205, the transmission power control unit 206, and the communication unit 207 will be described.

The margin calculation unit 205 calculates a margin owned by the antenna 10 on the basis of desired wave intensity C, interference wave intensity I, and a CIR calculated by the reception intensity calculation unit 203.

The transmission power control unit 206 controls a transmission power of the antenna 10 on the basis of the margin calculated by the margin calculation unit 205.

The communication unit 207 performs communication with the antenna 10. For example, the communication unit 207 provides a notification to set the value of the transmission power calculated by the transmission power control unit 206 to the antenna 10.

Figure 10:
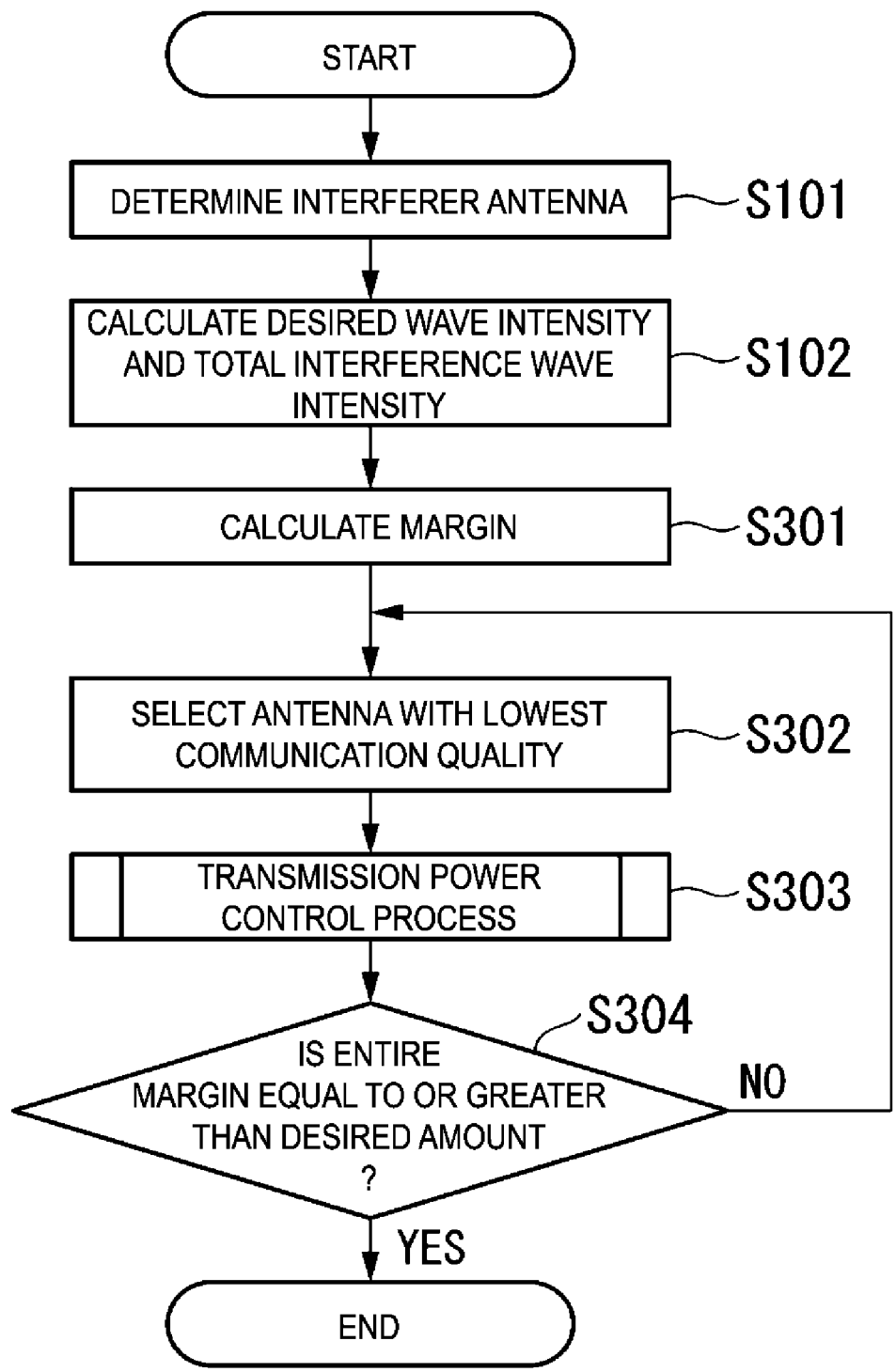
FIG. 10 is a flowchart illustrating an example of a method for determining a transmission power value.

FIG. 10 is a flowchart illustrating an example of a method for determining the value of the transmission power, which is an embodiment according to the sixth aspect of the present invention. In FIG. 10, reference signs similar to those in FIG. 8 are applied to processes similar to those in FIG. 8, and description thereof will be omitted.

If the process in Step S102 is ended, then the margin calculation unit 205 calculates a margin on the basis of the values of the desired wave intensity C, the interference wave intensity I, and the CIR output from the reception intensity calculation unit 203 and information regarding the antenna 10 that is notified to be an interferer antenna from the interference target determination unit 202 (Step S301). In the case of the example illustrated in FIG. 1, the margin calculation unit 205 calculates the margin using Equations (29) to (36) or Equations (37) to (44). The margin calculation unit 205 outputs the calculated margin information and the CINR to the transmission power control unit 206.

The transmission power control unit 206 selects an antenna 10 with the lowest communication quality on the basis of the margin information (Step S302). The antenna 10 with the lowest communication quality is an antenna 10 with the lowest margin value. The transmission power control unit 206 executes a transmission power control process on the basis of the selected antenna 10 (Step S303). The transmission power control process will be described later. Thereafter, the transmission power control unit 206 determines whether or not the entire margin is equal to or greater than a desired amount (Step S304). In a case in which the entire margin is equal to or greater than the desired amount (Step S304—YES), the antenna control device 20 ends the process in FIG. 10.

On the other hand, in a case in which the entire margin is less than the desired amount (Step S304—NO), the antenna control device 20 repeatedly executes the process in and after Step S302.

Figure 11:
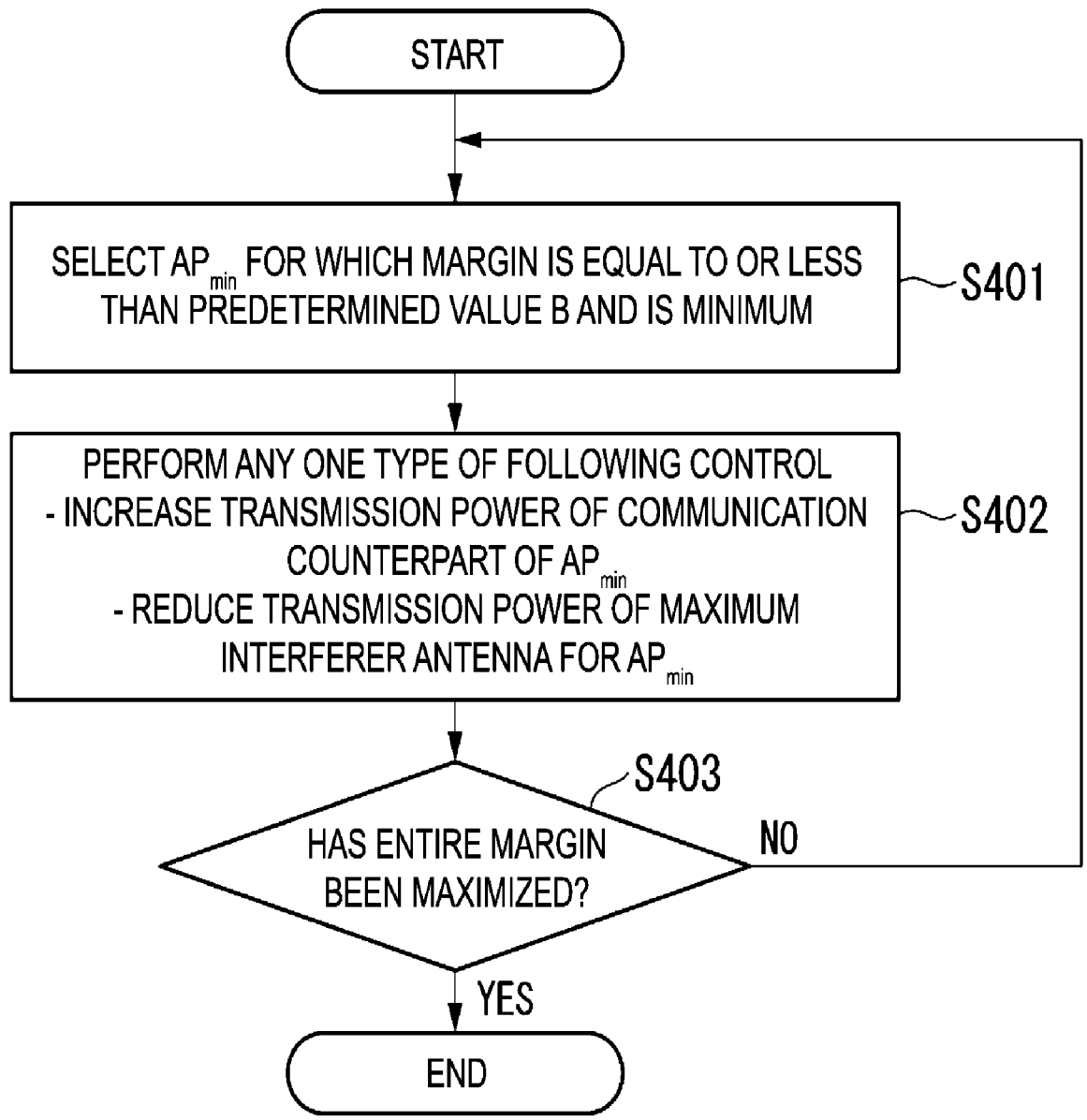
FIG. 11 is a flowchart illustrating a transmission power control process (overview) performed by a transmission power control unit.

FIG. 11 is a flowchart illustrating a flow of the transmission power control process (overview) performed by the transmission power control unit 206.

The transmission power control unit 206 selects an antenna 10 for which a margin calculated by the margin calculation unit 205 is equal to or less than a predetermined value B and is minimum (hereinafter, such antenna 10 is referred to as "$AP_{min}$") (Step S401). The transmission power control unit 206 performs control either for increasing the transmission power of the communication counterpart of $AP_{min}$ or for reducing the transmission power of the maximum interference source of $AP_{min}$ on the basis of the selected $AP_{min}$ (Step S402). The transmission power control unit 206 determines whether or not the entire margin has been maximized (Step S403). In a case in which the entire margin has been maximized (Step S403—YES), the transmission power control unit 206 ends the process in FIG. 9.

On the other hand, in a case in which the entire margin has not been maximized (Step S403—NO), the transmission power control unit 206 repeatedly executes the process in and after Step S401.

Figure 12:
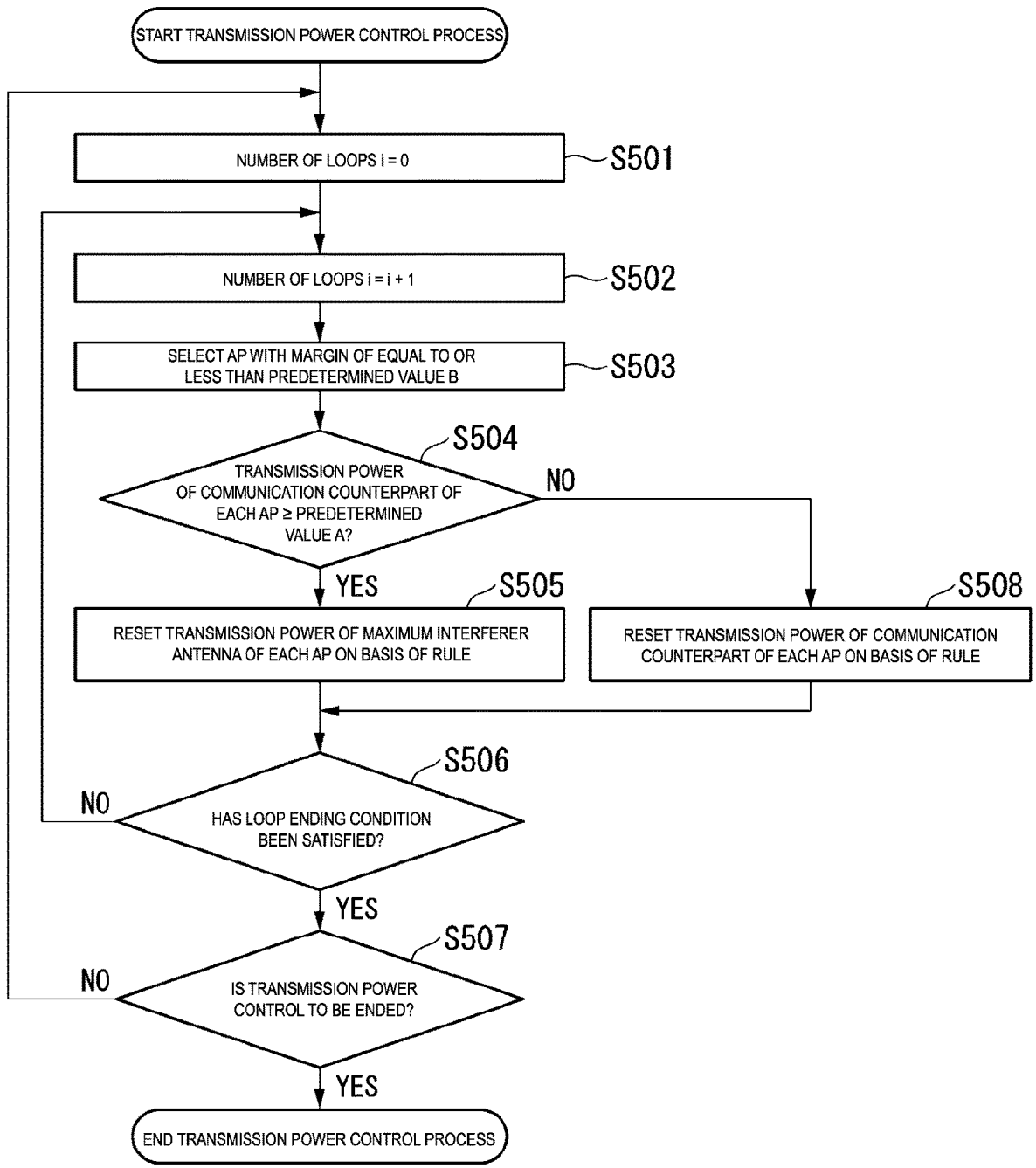
FIG. 12 is a flowchart illustrating the transmission power control process performed by the transmission power control unit.
Figure 13:
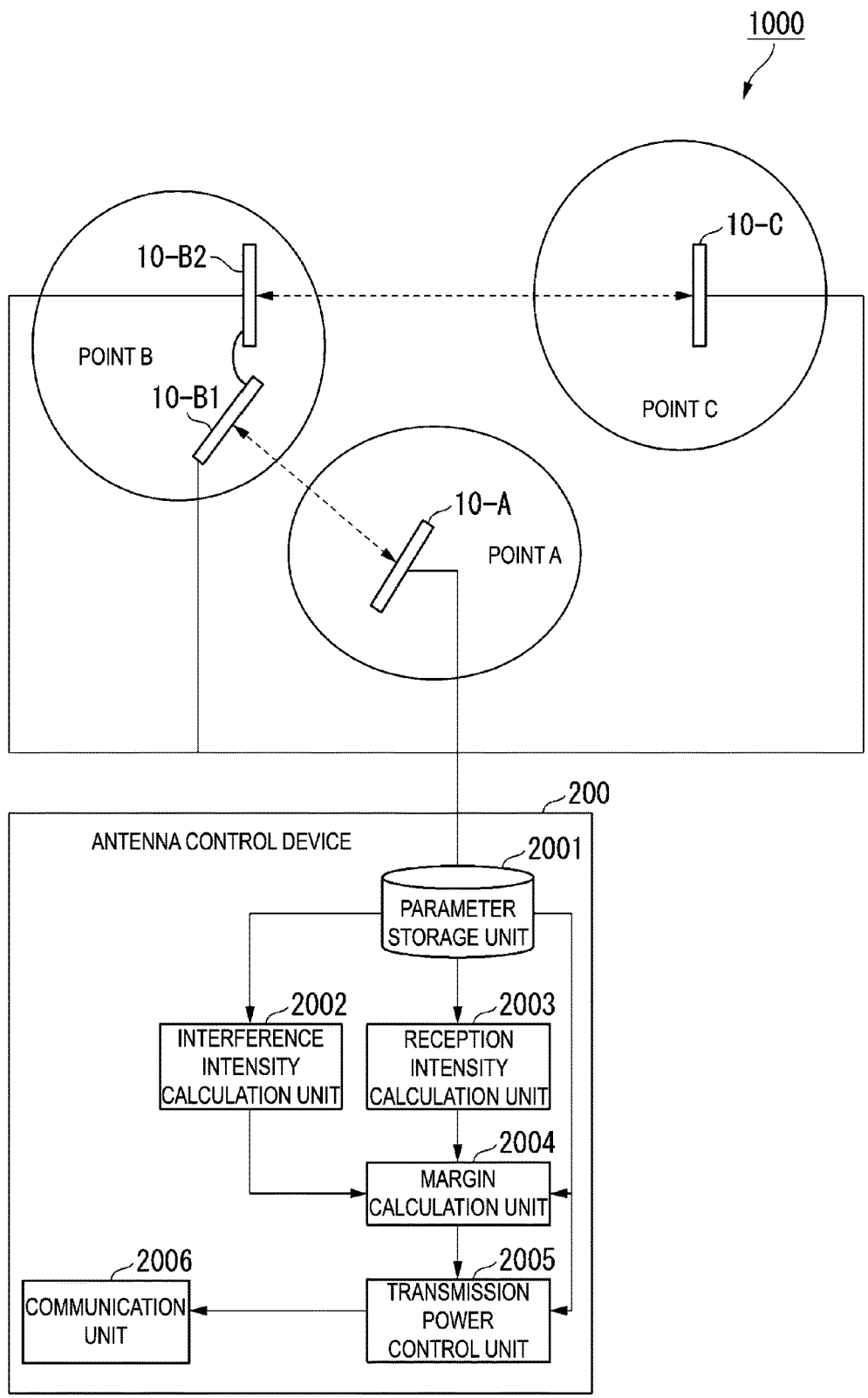
FIG. 13 is a configuration diagram illustrating a system configuration of a wireless communication system in the related art.
Figure 14:
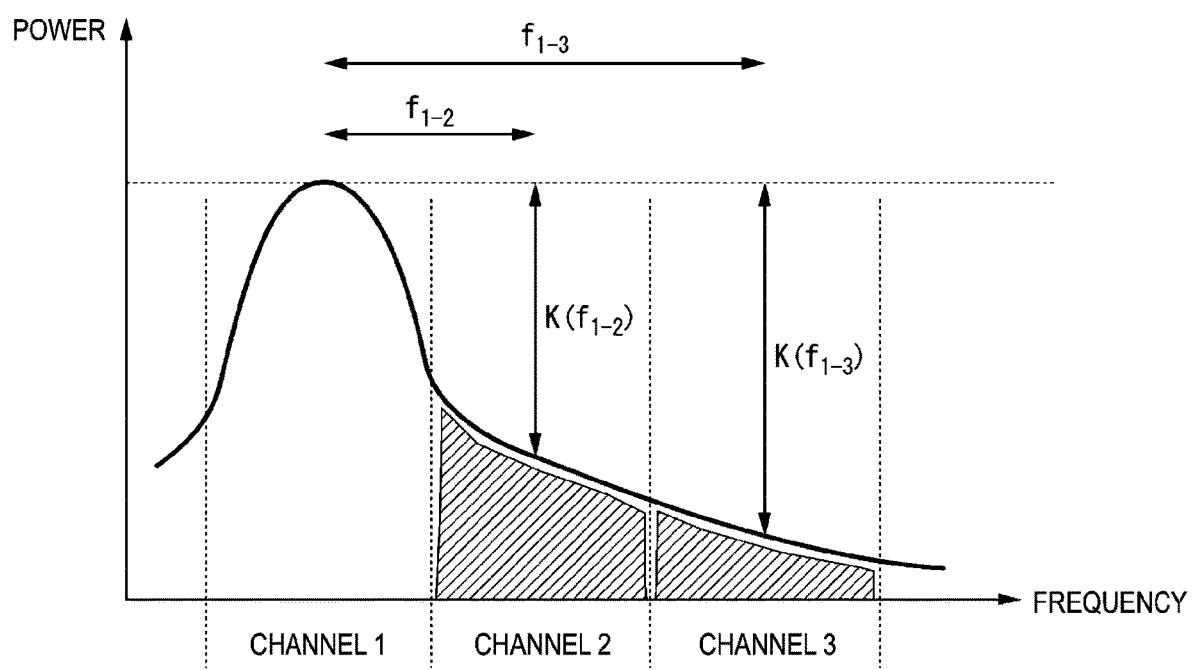
FIG. 14 is a diagram for explaining inter-channel leakage power.
Figure 15:
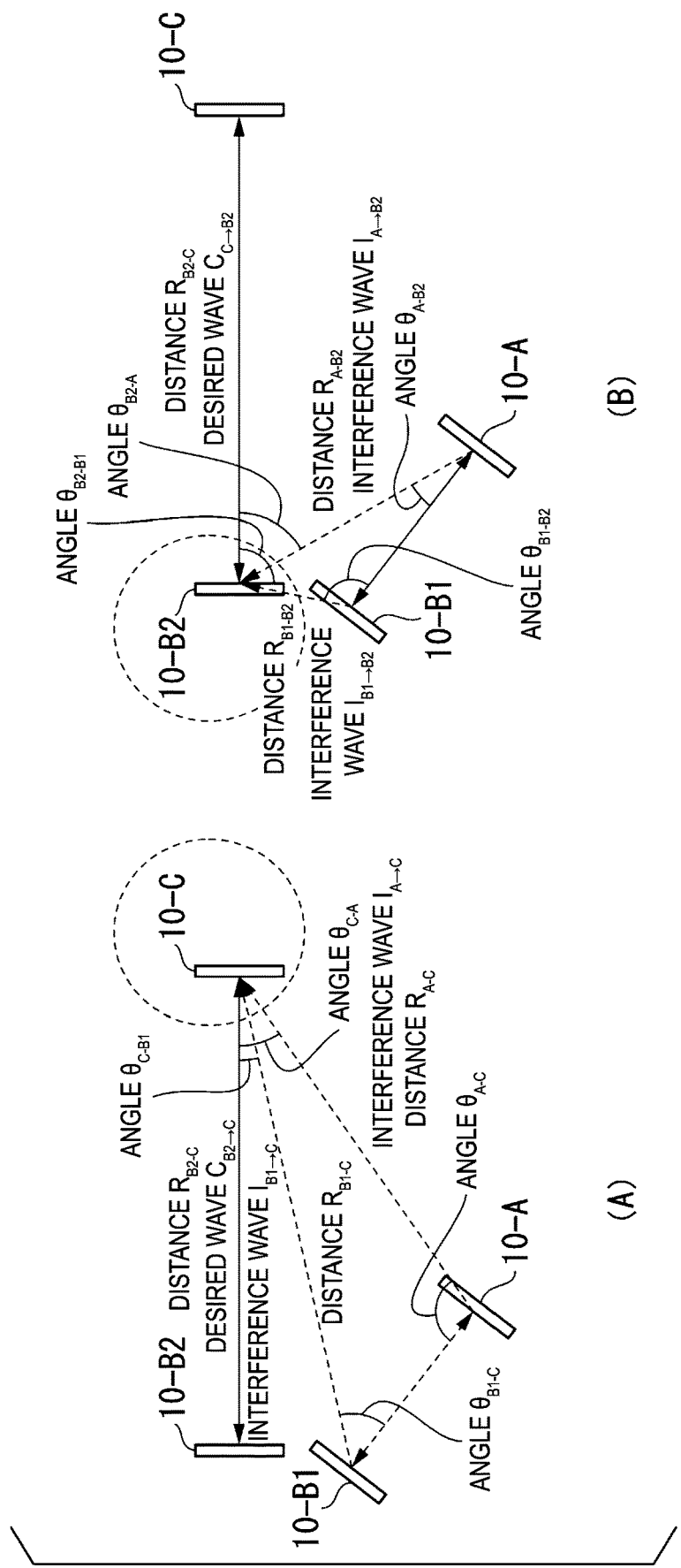
FIG. 15 is a schematic view for explaining a method for deriving equations for a desired wave intensity C and an interference wave intensity I.
Figure 16:
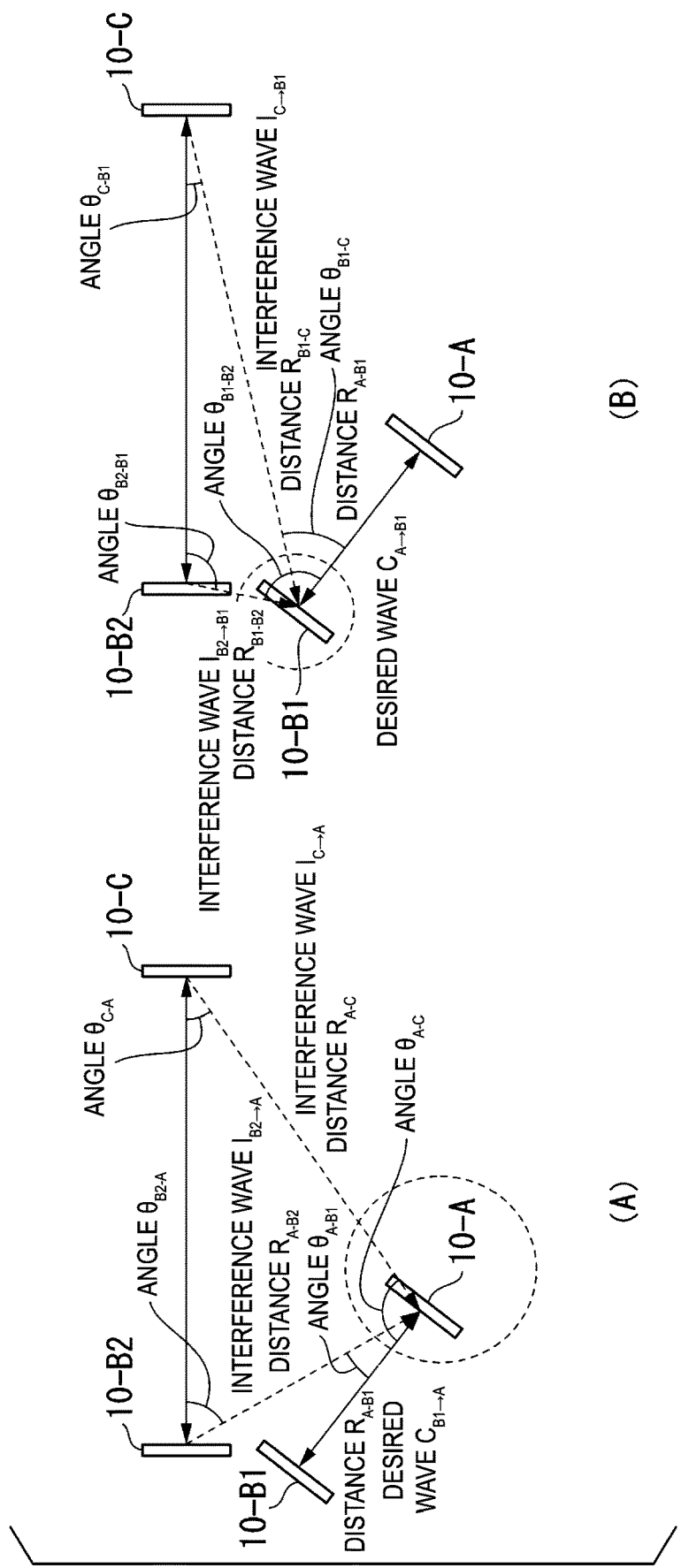
FIG. 16 is a schematic view for explaining the method for deriving the equations for the desired wave intensity C and the interference wave intensity I.
Figure 17:
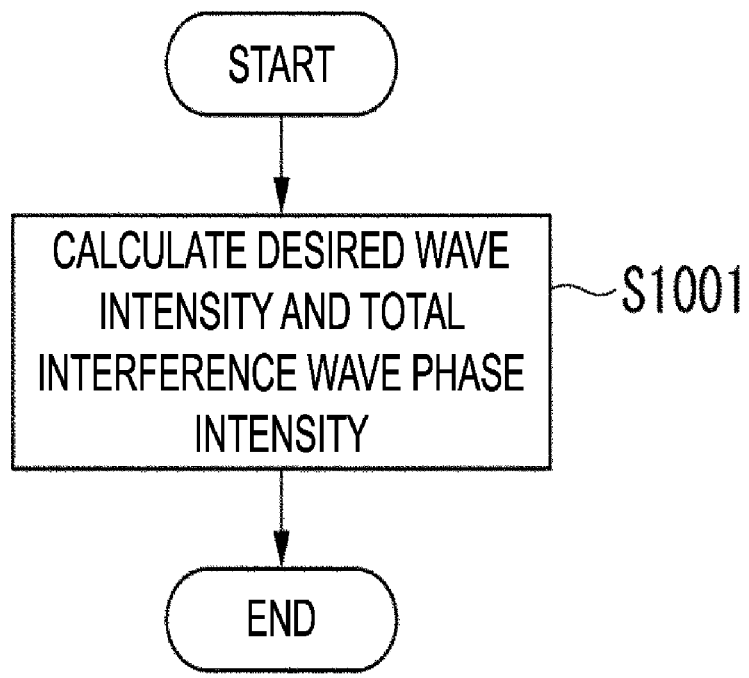
FIG. 17 is a flowchart illustrating a reception intensity calculation process performed by an antenna control device in the related art.

FIG. 12 is a flowchart illustrating a flow of the transmission power control process performed by the transmission power control unit 206.

The transmission power control unit 206 initializes the number of loops i by setting the number of loops i to 0 (Step S501). Next, the transmission power control unit 206 adds 1 to the number of loops i (Step S502). The transmission power control unit 206 selects antennas 10 with margins of equal to or less than the predetermined value B (Step S503). Here, in a case in which a plurality of antennas 10 have margins that are equal to or less than the predetermined value B, the transmission power control unit 206 may select all the antennas 10 with the margins of equal to or less than the predetermined value B or may select some of the plurality of antennas 10, for example, a minimum margin antenna 10 or randomly selected antennas 10.

Next, the transmission power control unit 206 determines whether or not the transmission power of the communication counterpart of each antenna 10 is equal to or greater than a predetermined value A for each selected antenna 10 (Step S504). In a case in which the transmission power of the communication counterpart of each antenna 10 is equal to or greater than the predetermined value A (Step S504—YES), the transmission power control unit 206 resets the transmission power of the maximum interference source of each antenna 10 on the basis of a rule (Step S505). Specifically, the transmission power control unit 206 reduces, increases, or leaves the transmission power of the maximum interference source of $AP_{min}$. For example, the transmission power control unit 206 resets the transmission power of the maximum interference source of $AP_{min}$ to any of a specific amount defined in advance, a minimum value/maximum value with which the margin becomes greater than the minimum, a minimum value with which the margin becomes equal to or greater than 0, a value in accordance with the value of i, a specific value in accordance with the number of repetitions and a value in accordance with the number of repetitions and the value of i.

Thereafter, the transmission power control unit 206 determines whether or not a loop ending condition has been satisfied (Step S506). Considerable loop ending conditions includes, for example, a case in which any of a case where the value of i is equal to or greater than the number of times set in advance, a case where the process time is equal to or greater than a specific process time, a case where the amount of received interference of all the antennas 10 is equal to or less than a specific value, and a case where a margin improvement degree of the antenna 10 in each loop is equal to or less than a specific value is satisfied.

In a case in which the loop ending condition is not satisfied (Step S506—NO), the transmission power control unit 206 executes the process in and after Step S502.

On the other hand, in a case in which the loop ending condition is satisfied (Step S506—YES), the transmission power control unit 206 determines whether or not the transmission power control is to be ended (Step S507). For example, the transmission power control unit 206 may determine that the transmission power control is to be ended in a case in which the entire margin has been maximized. In a case in which the transmission power control is to be ended (Step S507—YES), the transmission power control unit 206 ends the transmission power control process.

On the other hand, in a case in which the transmission power control is not to be ended (Step S507—NO), the transmission power control unit 206 executes the process in and after Step S501 with changed control parameters.

Also, in a case in which the transmission power of the communication counterpart in any of the antennas 10 is less than the predetermined value A (Step S504—NO) in the process in Step S504, the transmission power control unit 206 resets the transmission power of the communication counterpart of each antenna 10 on the basis of a rule (Step S508). The resetting method is similar to that in Step S505. Thereafter, the transmission power control unit 206 executes the process in Step S506. Note that the processes in Step S505 and Step S508 corresponds to the exemplary embodiments according to the fifth and sixth aspects of the present invention.

According to the antenna control device 20a configured as described above, effects similar to those in the first embodiment can be obtained.

Also, the antenna control device 20a controls a transmission power of the antenna 10 that is a communication counterpart of the antenna 10 with communication quality of equal to or less than a predetermined value among the victim antennas and the interferer antennas or a transmission power of the antenna 10 of the maximum interference source of the maximum interference source. It is thus possible to improve communication quality.

Also, although the interference waves coming from the interferer antennas in the same system have been assumed in the present embodiment, the present invention can also be applied to interference waves coming from other systems as long as the positions, directions, and the like on the side of other systems are known. In a case of the application, control such as an improvement in intra-system CIR caused by an increase in intra-system transmission power is conceivable as the transmission power control.

Modification Examples Common to First Embodiment and Second Embodiment

Although the example of the main beam direction has been described as the beam direction in the present embodiment, a method of setting a distance threshold value for each angle in consideration of the antenna directivity pattern and the like may be applied. By this, when side lobes are large and an interference occurs even in the side-lobe direction, the interference wave can be taken into consideration. Conceivable antenna directivity patterns to be used includes, for example, a method of using a catalog value, a method of using a value obtained through actual measurement in consideration of the individual value of the antenna 10, and the like. In a case of such a configuration, the antenna control devices 20 and 20a determine the antenna 10 that satisfies the first condition to be the interference-giving antenna in a case in which the first condition is satisfied in the side-lobe direction other than the main beam direction as the beam direction.

Although the present embodiment has been described on the assumption of the millimeter wave FWA, the present embodiment can similarly be applied to the wireless systems with known wireless parameters and electric wave propagation parameter other than those of FWA and signals of frequency bands other than millimeter waves.

The antenna control devices 20 and 20a may be virtual machines such as cloud resources.

The antenna control devices 20 and 20a in the aforementioned embodiments may be implemented by computers. In such a case, the antenna control devices 20 and 20a may be implemented by recording a program for realizing the functions in a computer readable recording medium and causing a computer system to read and execute the program recorded in the recording medium. Note that the "computer system" described here incudes OS and hardware such as peripheral devices. Also, the "computer-readable recording medium" is a portable medium such as a flexible disk, a magneto-optical disk, a ROM, or a CD-ROM or a storage device such as a hard disk incorporated in the computer system. Further, the "computer-readable recording medium" may include a recording medium that dynamically holds the program in a short period of time such as a communication line in a case in which the program is transmitted via a network such as the Internet or a communication line such as a telephone line and a recording medium that holds the program for a certain period of time such as a volatile memory inside the computer system that serves as a server or a client in that case. The aforementioned program may implement a part of the aforementioned functions, may implement the aforementioned functions in combination with a program that has already been recorded in the computer system, or may implement the functions using a programmable logic device such as a field programmable gate array (FPGA).

Although the embodiments of the present invention have been described above in detail with reference to the drawings, specific configurations are not limited to the embodiments and include designs without departing from the gist of the present invention.

REFERENCE SIGNS LIST 10 (10-1, 10-B1, 10-B2, 10-C) Antenna
20, 20a Antenna control device
201 Parameter storage unit
202 Interference target determination unit
203 Reception intensity calculation unit
204 Interference intensity calculation unit
205 Margin calculation unit
206 Transmission power control unit
207 Communication unit

The invention claimed is:

1. An interference wave arithmetic operation method performed by a wireless communication system including a plurality of antennas, the method comprising:
determining an interferer antenna on a basis of information regarding directivity, a position, and an orientation of each of the plurality of antennas;
calculating interference wave reception intensity of a victim antenna using an interference wave from the determined interferer antenna; and
controlling transmission power of at least one arbitrary antenna of the victim antenna and the interferer antenna,
wherein, in controlling the transmission power, the transmission power is controlled by performing one or more iterative calculations of transmission power of an antenna that is a communication counterpart of an antenna with communication quality equal to or less than a predetermined value among the victim antenna and the interferer antenna or transmission power of an interferer antenna that serves as a maximum interference source according to an equation for formulating an amount of interference of the interferer antenna.

2. The interference wave arithmetic operation method according to claim 1, wherein, in determining the interferer antenna, threshold determination is performed on each interferer antenna in accordance with station coordinates and a station direction.

3. The interference wave arithmetic operation method according to claim 2, wherein, in determining the interferer antenna, a threshold value for determining the interferer antenna is determined on the basis of one or both of an angle of the victim antenna and a distance between the victim antenna and the interferer antenna, and an antenna with a value within the threshold value is determined to be the interferer antenna.

4. The interference wave arithmetic operation method according to claim 1, wherein, in determining the interferer antenna, an antenna that satisfies one or both of a first condition and a second condition is determined to be the interferer antenna, the first condition being a condition that the antenna is positioned in a beam direction of the victim antenna, or the victim antenna is positioned in a beam direction of the antenna, or the victim antenna and the antenna are positioned in mutual beam directions, the second condition being a condition that a distance between the victim antenna and the antenna is equal to or less than a threshold value.

5. An interference wave arithmetic operation device in a wireless communication system including a plurality of antennas, the device comprising:
an interference target determination unit, including one or more processors, configured to determine an interferer antenna on a basis of information regarding directivity, a position, and an orientation of each of the plurality of antennas;
a reception intensity calculation unit, including one or more processors, configured to calculate interference wave reception intensity of a victim antenna using an interference wave from the determined interferer antenna; and
a transmission power control unit, including one or more processors, configured to control transmission power of at least one arbitrary antenna of the victim antenna and the interferer antenna,
wherein, in controlling the transmission power, the transmission power control unit is configured to control the transmission power by performing one or more iterative calculations of transmission power of an antenna that is a communication counterpart of an antenna with communication quality equal to or less than a predetermined value among the victim antenna and the interferer antenna or transmission power of an interferer antenna that serves as a maximum interference source according to an equation for formulating an amount of interference of the interferer antenna.

6. The interference wave arithmetic operation device according to claim 5, wherein, in determining the interferer antenna, the interference target determination unit is configured to perform threshold determination on each interferer antenna in accordance with station coordinates and a station direction.

7. The interference wave arithmetic operation device according to claim 6, wherein, in determining the interferer antenna, the interference target determination unit is configured to determine a threshold value on the basis of one or both of an angle of the victim antenna and a distance between the victim antenna and the interferer antenna, and an antenna with a value within the threshold value is determined to be the interferer antenna.

8. The interference wave arithmetic operation device according to claim 5, wherein, in determining the interferer antenna, the interference target determination unit is configured to determine an antenna to be the interferer antenna that satisfies one or both of a first condition and a second condition, the first condition being a condition that the antenna is positioned in a beam direction of the victim antenna, or the victim antenna is positioned in a beam direction of the antenna, or the victim antenna and the antenna are positioned in mutual beam directions, the second condition being a condition that a distance between the victim antenna and the antenna is equal to or less than a threshold value.

9. A non-transitory computer readable medium storing one or more instructions causing a computer to execute:
   determining an interferer antenna on a basis of information regarding directivity, a position, and an orientation of each of the plurality of antennas;
   calculating interference wave reception intensity of a victim antenna using an interference wave from the determined interferer antenna; and
   controlling transmission power of at least one arbitrary antenna of the victim antenna and the interferer antenna,
   wherein, in controlling the transmission power, the transmission power is controlled by performing one or more iterative calculations of transmission power of an antenna that is a communication counterpart of an antenna with communication quality equal to or less than a predetermined value among the victim antenna and the interferer antenna or transmission power of an interferer antenna that serves as a maximum interference source according to an equation for formulating an amount of interference of the interferer antenna.

10. The non-transitory computer readable medium according to claim 9, wherein, in determining the interferer antenna, threshold determination is performed on each interferer antenna in accordance with station coordinates and a station direction.

11. The non-transitory computer readable medium according to claim 10, wherein, in determining the interferer antenna, a threshold value for determining the interferer antenna is determined on the basis of one or both of an angle of the victim antenna and a distance between the victim antenna and the interferer antenna, and an antenna with a value within the threshold value is determined to be the interferer antenna.

12. The non-transitory computer readable medium according to claim 9, wherein, in determining the interferer antenna, an antenna that satisfies one or both of a first condition and a second condition is determined to be the interferer antenna, the first condition being a condition that the antenna is positioned in a beam direction of the victim antenna, or the victim antenna is positioned in a beam direction of the antenna, or the victim antenna and the antenna are positioned in mutual beam directions, the second condition being a condition that a distance between the victim antenna and the antenna is equal to or less than a threshold value.

* * * * *